(12) United States Patent
Tanji

(10) Patent No.: US 10,552,956 B2
(45) Date of Patent: Feb. 4, 2020

(54) RECONSTRUCTION METHOD OF BIOLOGICAL TISSUE IMAGE, APPARATUS THEREFOR, AND IMAGE DISPLAY APPARATUS USING THE BIOLOGICAL TISSUE IMAGE

(71) Applicant: CANON KABUSHIKI KAISHA, Tokyo (JP)

(72) Inventor: Koichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 15/298,848

(22) Filed: Oct. 20, 2016

(65) Prior Publication Data

US 2017/0039712 A1    Feb. 9, 2017

Related U.S. Application Data

(63) Continuation of application No. 14/147,985, filed on Jan. 6, 2014, now abandoned.

(30) Foreign Application Priority Data

Jan. 8, 2013  (JP) ............................... 2013-000883
Aug. 6, 2013  (JP) ............................... 2013-163399
Dec. 4, 2013  (JP) ............................... 2013-251050

(51) Int. Cl.
*G06T 7/00*   (2017.01)
*G06K 9/00*   (2006.01)
*G06T 11/00*  (2006.01)

(52) U.S. Cl.
CPC ........ *G06T 7/0014* (2013.01); *G06K 9/00147* (2013.01); *G06T 11/003* (2013.01); *G06T 2207/10056* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 8,280,140 B2 | 10/2012 | Levenson et al. | |
| 2004/0209237 A1 | 10/2004 | Flewelling et al. | |
| 2006/0078165 A1 | 4/2006 | Watanabe | |
| 2007/0179367 A1* | 8/2007 | Ruchti | A61B 5/14532 600/310 |
| 2007/0189443 A1* | 8/2007 | Walter | A61B 6/032 378/4 |
| 2009/0326383 A1 | 12/2009 | Barnes et al. | |

(Continued)

FOREIGN PATENT DOCUMENTS

| | | |
|---|---|---|
| JP | 2010-071953 A | 4/2010 |
| JP | 2010-085219 A | 4/2010 |

*Primary Examiner* — Jiangeng Sun
(74) *Attorney, Agent, or Firm* — Venable LLP

(57) ABSTRACT

The present invention provides a method for classifying biological tissues with high precision compared to a conventional method. When measuring a spectrum which has a two-dimensional distribution that is correlated with a slice of a biological tissue, and acquiring a biological tissue image from the two-dimensional measured spectrum, the method includes dividing an image region into a plurality of small blocks, and then reconstructing the biological tissue image by using the measured spectrum and a classifier corresponding to each of the regions.

18 Claims, 23 Drawing Sheets

(56) References Cited

U.S. PATENT DOCUMENTS

| | | | | |
|---|---|---|---|---|
| 2010/0002929 | A1* | 1/2010 | Sammak | G06K 9/00127 |
| | | | | 382/133 |
| 2010/0111396 | A1* | 5/2010 | Boucheron | G06K 9/0014 |
| | | | | 382/133 |
| 2010/0260390 | A1* | 10/2010 | Liang | G06K 9/3233 |
| | | | | 382/128 |
| 2010/0266185 | A1* | 10/2010 | Matulewicz | G06K 9/62 |
| | | | | 382/131 |
| 2011/0228970 | A1 | 9/2011 | Kajihara et al. | |
| 2011/0275931 | A1* | 11/2011 | Debuc | A61B 3/102 |
| | | | | 600/425 |
| 2012/0082362 | A1* | 4/2012 | Diem | A61B 5/0071 |
| | | | | 382/133 |
| 2012/0112098 | A1* | 5/2012 | Hoyt | B82Y 30/00 |
| | | | | 250/459.1 |
| 2012/0191635 | A1* | 7/2012 | Bigio | A61B 5/0059 |
| | | | | 706/13 |
| 2012/0242817 | A1* | 9/2012 | Pan | G06K 9/00134 |
| | | | | 348/77 |
| 2013/0121546 | A1* | 5/2013 | Guissin | G06T 7/0012 |
| | | | | 382/128 |
| 2013/0195327 | A1 | 8/2013 | Tanji | |
| 2013/0195328 | A1 | 8/2013 | Tanji | |
| 2013/0338496 | A1* | 12/2013 | Hielscher | A61B 5/0064 |
| | | | | 600/425 |
| 2014/0010430 | A1* | 1/2014 | Chandelier | A61B 6/5217 |
| | | | | 382/131 |

\* cited by examiner

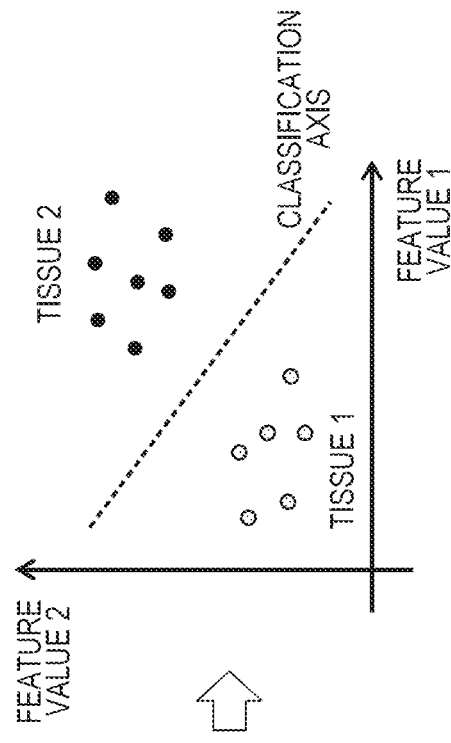
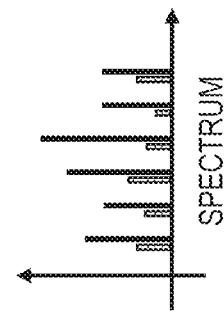
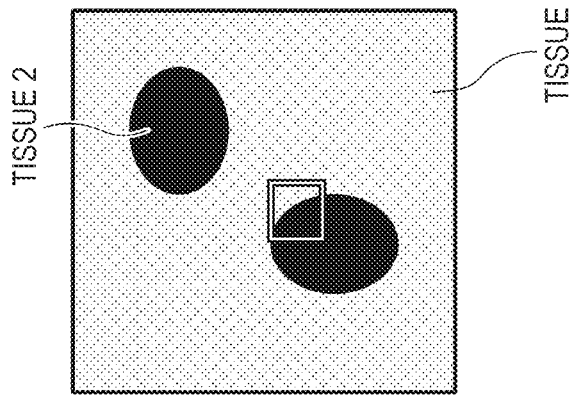

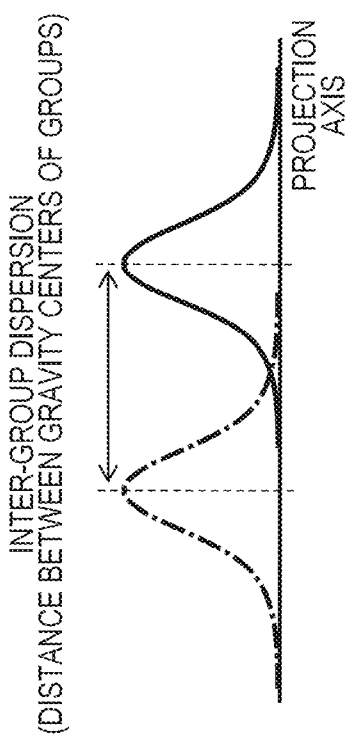
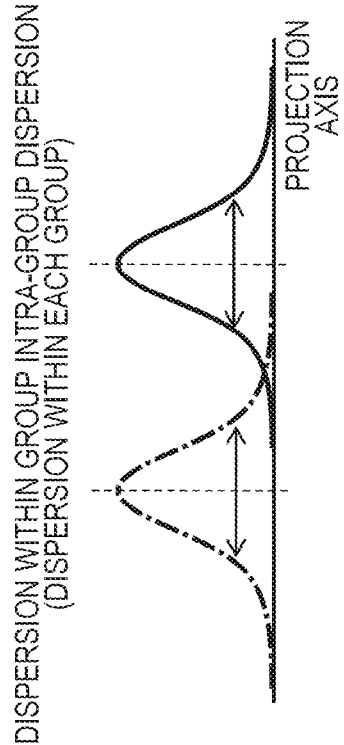
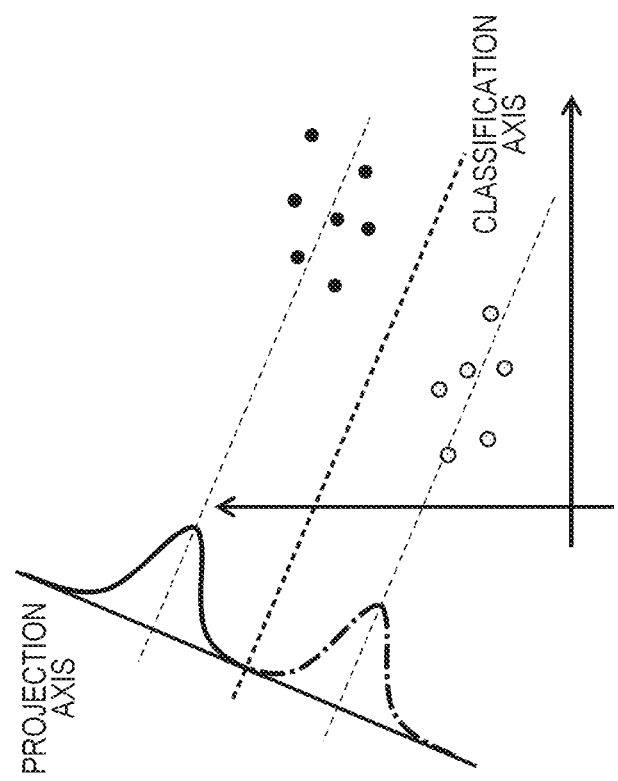

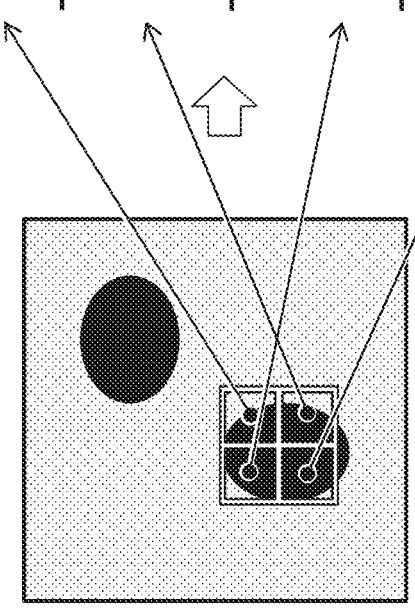
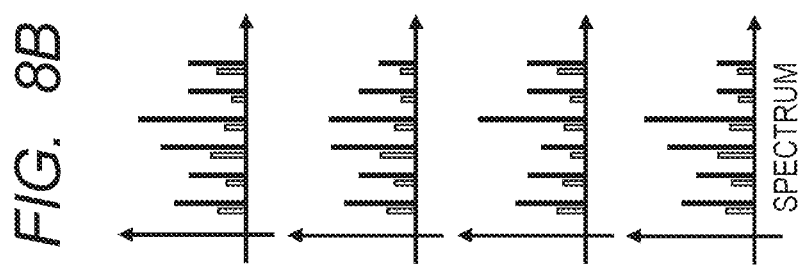
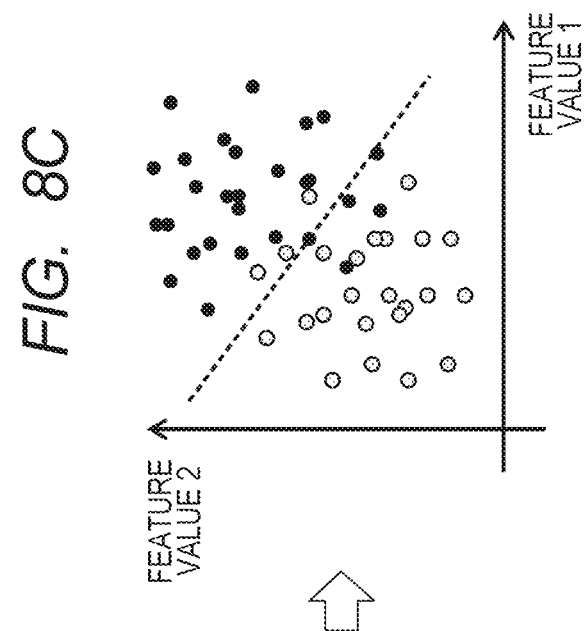
FIG. 8A
FIG. 8B
FIG. 8C

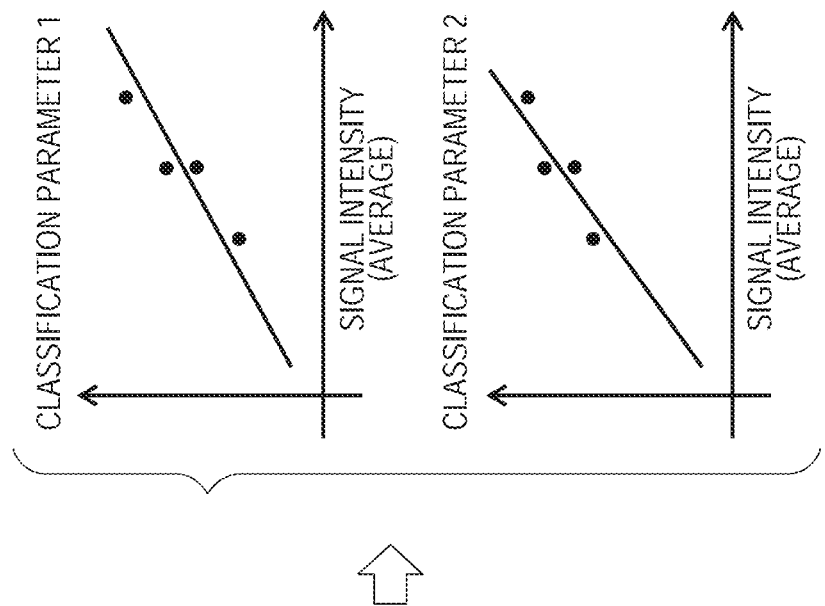
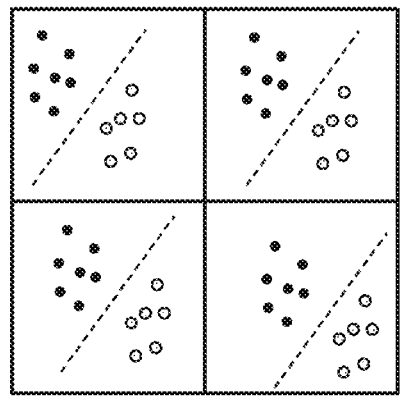
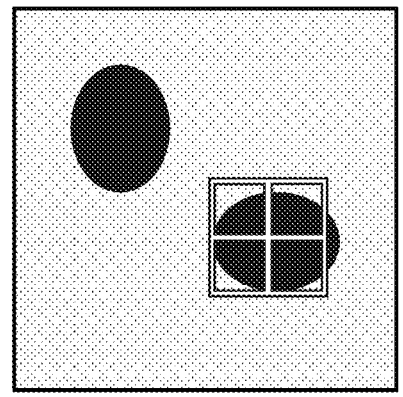

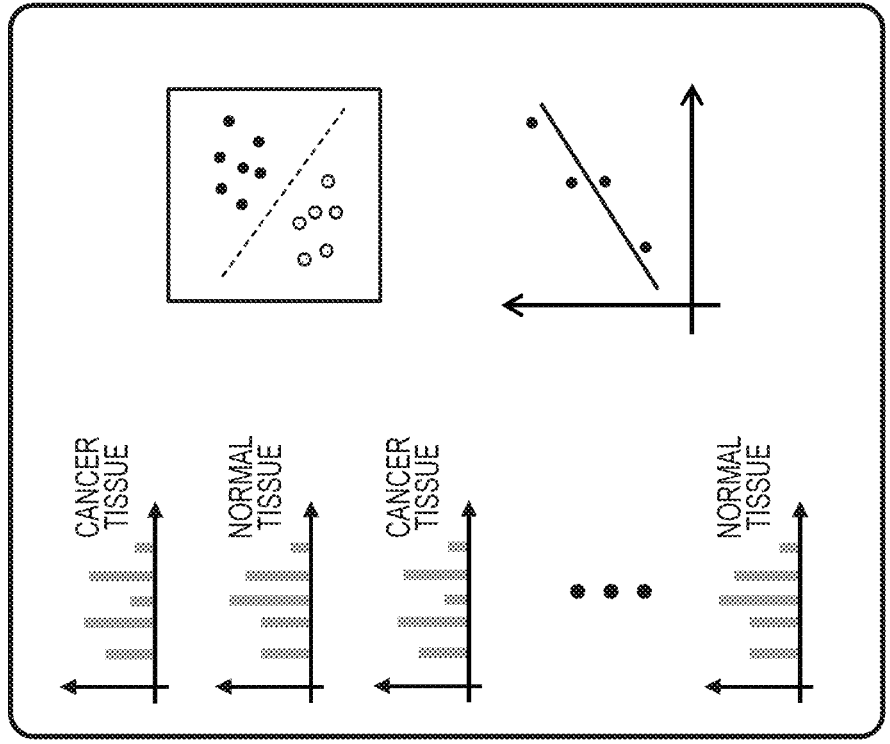
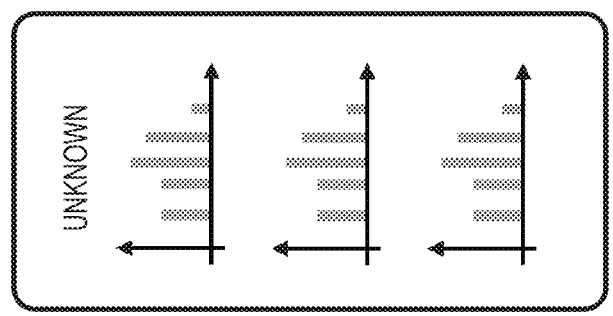
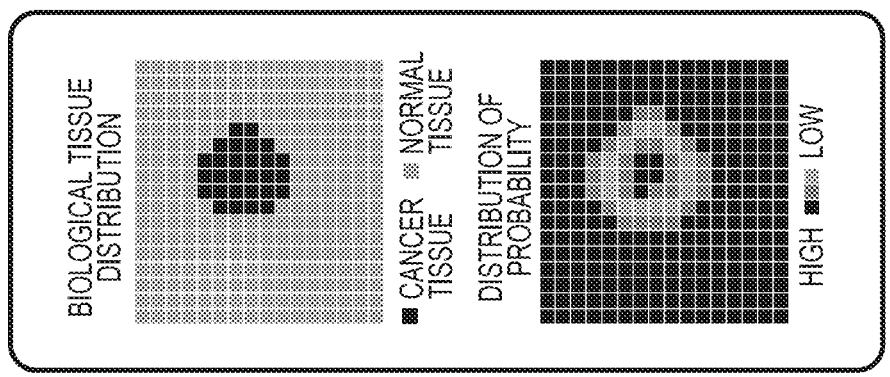

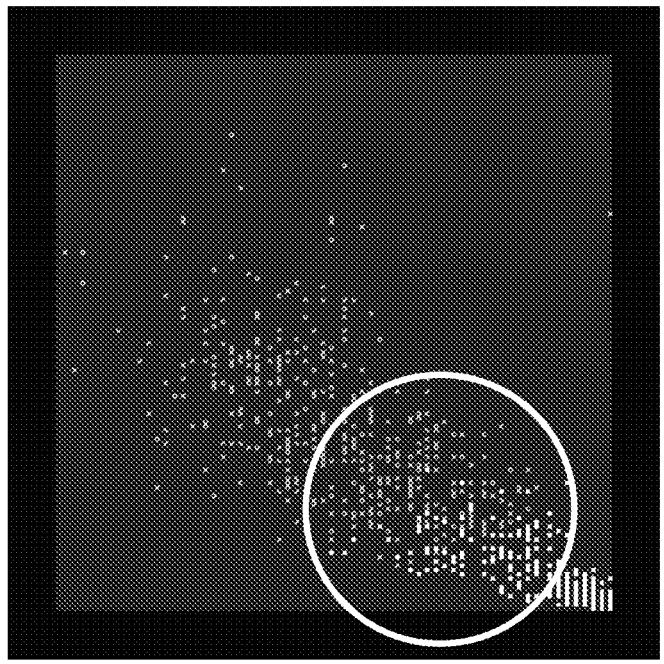
FIG. 13B
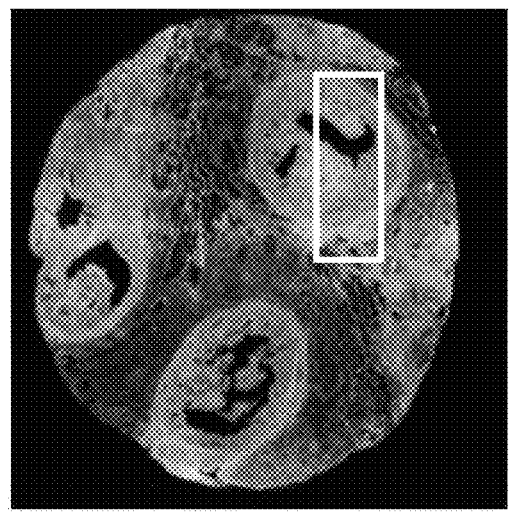
FIG. 13A

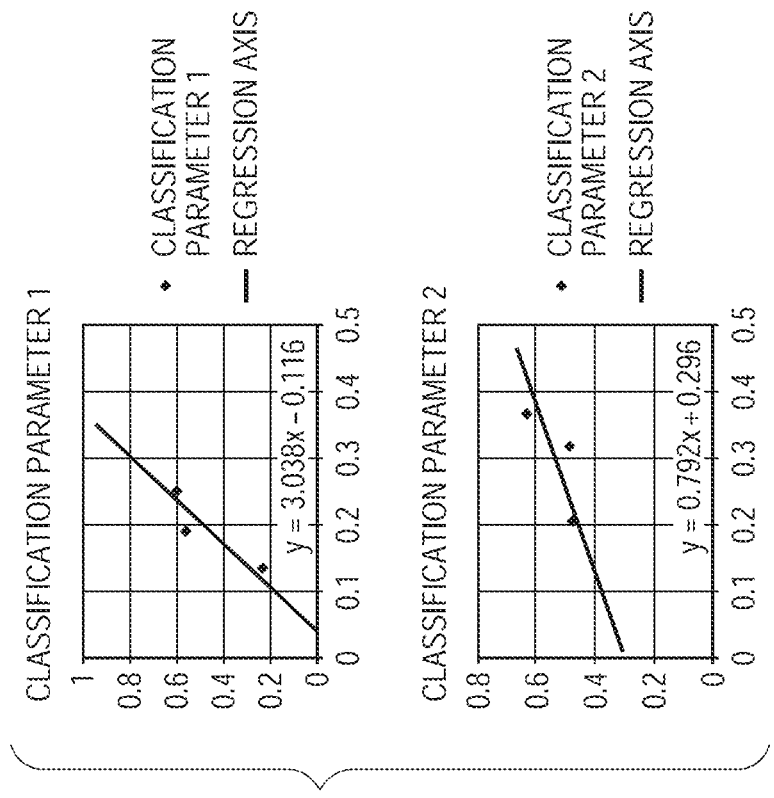
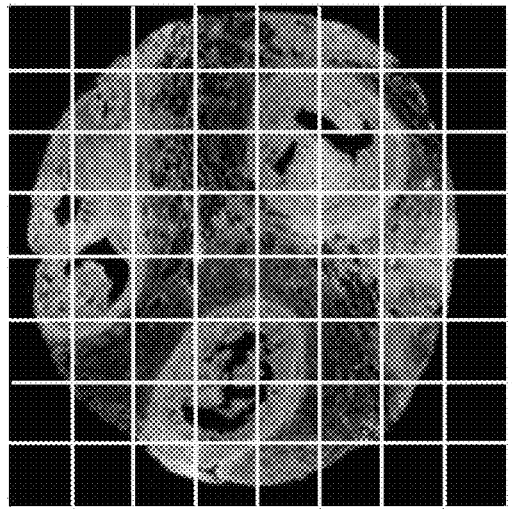
FIG. 14A
FIG. 14B

FIG. 22
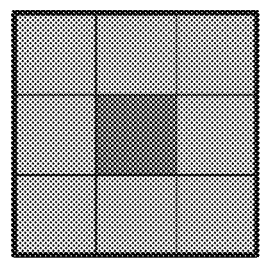
0-ORDER
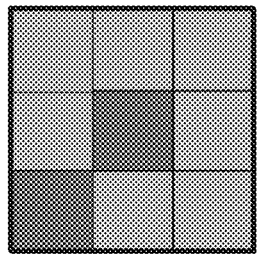
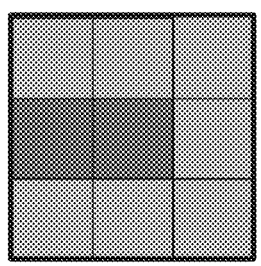
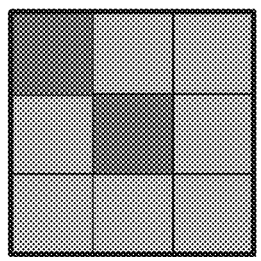
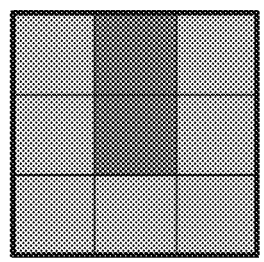
1-ORDER

RECONSTRUCTION METHOD OF BIOLOGICAL TISSUE IMAGE, APPARATUS THEREFOR, AND IMAGE DISPLAY APPARATUS USING THE BIOLOGICAL TISSUE IMAGE

The present application is a continuation of U.S. patent application Ser. No. 14/147,985 filed Jan. 6, 2014, the entire disclosure of which is incorporated by reference herein.

BACKGROUND OF THE INVENTION

Field of the Invention

The present invention relates to a reconstruction method of a biological tissue image and an apparatus therefor, and particularly relates to a method for reconstructing a biological tissue image from measured spectrum data which is correlated with a substance distributed within a biological tissue, and to an apparatus therefor. The present invention also relates to an image display apparatus for clearly displaying a lesion at a pathological diagnosis by using thus acquired biological tissue image.

Description of the Related Art

Conventionally, a pathological diagnosis has been conducted which is specifically a diagnosis for the presence or absence of a lesion and a type of the lesion, based on the observation for a biological tissue of an object by a microscope or the like. In the pathological diagnosis, a constitutive substance and a contained substance which are correlated with a biological tissue of an object to be observed are required to be visualized. So far, a technique for staining a specific antigen protein by using an immunostaining method has mainly been employed in the pathological diagnosis. When breast cancer is taken as an example, ER (estrogen receptor which is expressed in hormone-dependent tumor) which serves as a determination criterion for hormone therapy and HER2 (membrane protein to be found in fast-growing cancer) which serves as a determination criterion for Herceptin administration are visualized by the immunostaining method. However, the immunostaining method has such problems that the reproducibility is poor because an antibody is unstable and antigen-antibody reaction efficiency is difficult to be controlled. In addition, when needs of such a functional diagnosis will be grown in the future, for instance, and when there arises a need of detecting several tens or more types of constitutive substances or contained substances, the currently-employed immunostaining method has a problem of being incapable of meeting the need any more.

In addition, in some cases, the visualization of the substance which is distributed within a biological tissue, such as the constitutive substance and the contained substance, is not sufficient at a tissue level, and the visualization at a cellular level is required. For instance, in research on a cancer stem cell, it was revealed that a tumor was formed in only part of fractions of a tumor tissue after xenotransplantation to immunocompromised mice, and accordingly, it is being understood that the growth of a tumor tissue is dependent on differentiation and self-reproduction abilities of the cancer stem cells. In such examination, it is necessary not to observe the entire tissue, but to observe an expression distribution of a constitutive substance or a contained substance in each of individual cells in a tissue.

Incidentally, the above described "cellular level" means a level at which at least each of the individual cells can be classified. A diameter of the cell exists in a range of approximately 10 μm to 20 μm (provided that large cell such as nerve cell has diameter of about 50 μm). Accordingly, in order to acquire a two-dimensional distribution image at a cellular level, the spatial resolution needs to be 10 μm or less, can be 5 μm or less, further can be 2 μm or less, and still further can be 1 μm or less. The spatial resolution can be determined from a result of, for instance, a linear analysis of a knife-edge specimen. In other words, the spatial resolution is determined based on the general definition of "a distance between two points at which signal intensities originating in a concerned substance in the vicinity of the boundary of a specimen are 20% and 80%, respectively."

As described above, in the pathological diagnosis, the constitutive substance and the contained substance which are correlated with a lesion or a pathological tissue are required to be exhaustively visualized at a cellular level. The lesion or the pathological tissue means, for instance, a tumor tissue and the like. Candidates for a method of such visualization include secondary-ion mass spectrometry (SIMS) including time-of-flight secondary-ion mass spectrometry (TOF-SIMS). A mass spectrum is used as a measured spectrum. Furthermore, the candidates include also Raman spectroscopy. Usable measured spectra include spectra in an ultraviolet region, a visible region and an infrared region. These measurement methods can provide information at each of plural points in a space at high spatial resolution. Specifically, the measurement methods can provide spatial distribution information on each peak value of the measured spectrum which is correlated with a substance that is an object to be measured, and accordingly, can determine a spatial distribution of the substance in a biological tissue which is correlated with the measured spectrum.

An SIMS method is a method of obtaining a mass spectrum at each point on a specimen by irradiating the specimen with a primary ion beam and detecting secondary ions which have been separated from the specimen. In a TOF-SIMS, for instance, it is possible to obtain the mass spectrum at each point on the specimen by identifying the secondary ion with the use of such a fact that a flight time of the secondary ion depends on a mass m and an electric charge z of the ion.

A Raman spectroscopy acquires a Raman spectrum by irradiating a substance with a laser beam which is a monochromatic light as a light source, and detecting the generated Raman scattering light with a spectroscope or an interferometer. A difference (Raman shift) between a frequency of the Raman scattering light and a frequency of incident light takes a value peculiar to the structure of the substance, and accordingly the Raman spectroscopy can acquire the Raman spectrum peculiar to an object to be measured.

In order to acquire biological information from data of the measured spectrum, a conventional method has generated a classifier beforehand by machine learning, and has applied the generated classifier to the data of the measured spectrum of the specimen (see Japanese Patent Application Laid-Open No. 2010-71953). On the other hand, it has been attempted to overlap a measured spectrum image (spectrum information) with an optical image (morphological information) and display the overlapped image, because a biological tissue image is indispensable in a pathological diagnosis (see Japanese Patent Application Laid-Open No. 2010-85219). Incidentally, the machine learning described here means a technique of empirically learning data which have been previously acquired, and interpreting newly acquired data based on the learning results. Further, the classifier refers to determination criterion information to be generated by empirically learning a relationship between previously acquired data and biological information.

Conventionally, an example of diagnosing a disease by applying the classifier which has been generated by the machine learning is described also in Patent Document 1. The object to be diagnosed is one measured spectrum data (for one point on space or whole specimen), and it has not been assumed to acquire the biological tissue image from a spatial distribution of the measured spectrum. In addition, there is an example of overlapping the measured spectrum image (spectrum information) with the optical image (morphological information), but there has been no example of acquiring the biological tissue image by applying the machine learning (classifier) to both the spectrum information and the morphological information. Specifically, such a method has not been disclosed as to reconstruct a biological tissue image with high precision, which displays a diagnosis result related to a presence or an absence of a cancer and the like, from a result of having measured a spectrum having the spatial distribution for the biological tissue of an object.

In addition, when the measured spectrum has the spatial distribution, the characteristics of the data are different between positions at which the data is measured, for instance, a datum measured in the middle part of the image is different in the characteristics from that measured in the peripheral portion of the image. Accordingly, the classifier suitable for the position needs to be applied according to the position at which the data is measured. However, conventionally, such a method has not been disclosed as to have assumed such a situation.

SUMMARY OF THE INVENTION

According to one aspect of the present invention, there is provided a reconstruction method of a biological tissue image using a signal processing apparatus based on a measured spectrum correlated with a substance distributed within a biological tissue, which includes: acquiring, within an image region, the measured spectrum at each of plural points within the biological tissue; dividing the image region into a plurality of small blocks; selecting one or more of peaks of the measured spectrum in each of the small blocks; acquiring a classifier corresponding to each of the small blocks; and acquiring the biological tissue image per each of the small blocks based on the corresponding classifier.

According to another aspect of the present invention, there is provided a reconstruction method of a biological tissue image using a signal processing apparatus based on a measured spectrum correlated with a substance distributed within a biological tissue, which includes: acquiring the measured spectrum of the biological tissue; acquiring morphological information acquired from distribution information of a peak component in the measured spectrum; acquiring a classifier; and applying the classifier to both of the measured spectrum of the biological tissue and of the morphological information acquired from the distribution information of the peak component in the measured spectrum, to acquire the biological tissue image.

The biological tissue image acquired by the method of the present invention can be used for pathological diagnosis and the like.

Further features of the present invention will become apparent from the following description of exemplary embodiments with reference to the attached drawings.

BRIEF DESCRIPTION OF THE DRAWINGS

FIGS. 6A, 6B and 6C are schematic views of the discriminant analysis of an image block.

FIGS. 7A, 7B and 7C are views schematically illustrating a projection axis which maximizes a ratio of an inter-group dispersion to an intra-group dispersion.

FIGS. 8A, 8B and 8C are views schematically illustrating a state in which confounding occurs due to data with different conditions.

FIGS. 9A, 9B and 9C are schematic views illustrating a process of determining a regression model by the discriminant analysis of the block.

FIGS. 10A, 10B and 10C are views schematically illustrating a series of processes of the present invention.

FIGS. 13A and 13B are views illustrating that confounding occurs in data.

FIGS. 14A and 14B are views illustrating an application result of the regression analysis in the first exemplary embodiment of the present invention.

FIG. 22 is a schematic diagram illustrating a concept of a higher-order local autocorrelation (HLAC).

DESCRIPTION OF THE EMBODIMENTS

Preferred embodiments of the present invention will now be described in detail in accordance with the accompanying drawings.

Embodiments of the present invention will be specifically described below with reference to the flow charts and the drawings. Incidentally, the following specific example is one example of exemplary embodiments according to the present invention, but the present invention is not limited to any such specific embodiment. The present invention includes measuring a specimen having a composition distribution in a space, and can be applied to results provided by any measuring method as long as the measuring method can obtain the information of a measured spectrum correlated with a substance distributed within a biological tissue or a pathological tissue contained in a lesion so that the information corresponds to positional information at each point and positions of each point in the space.

Figure 4:
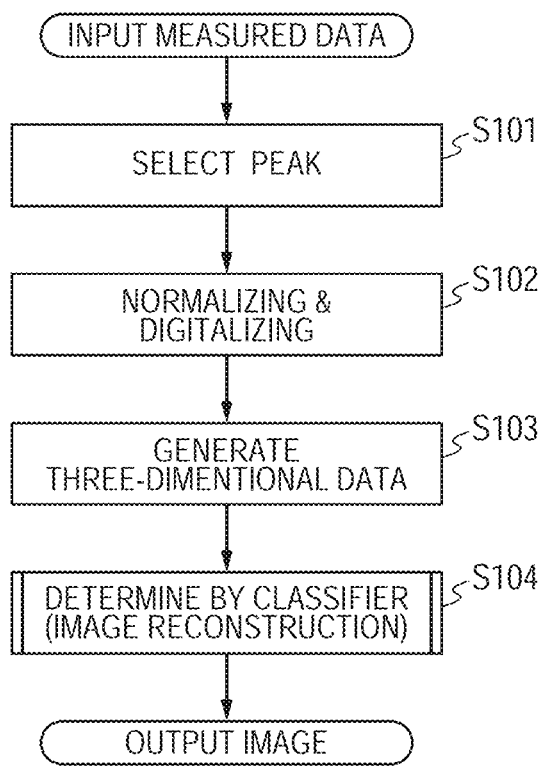
FIG. 4 is a flow chart of the present invention.

A view illustrated in FIG. 4 is a flow chart of image reconstruction according to the present invention. The embodiment will be described below with reference to the drawing according to the order in this flow chart.

Figure 3A:
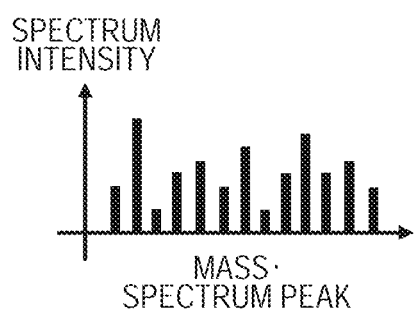
FIGS. 3A, 3B and 3C are conceptual views of peak components in a spectrum.
Figure 3B:
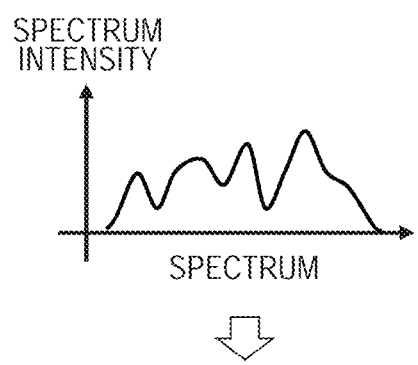
Figure 3C:
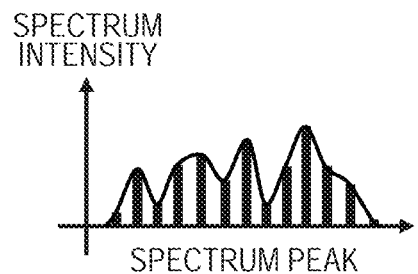

In the step of S101 in FIG. 4, a peak to be used in the image reconstruction is selected. Here, the peak means a peak of signal intensity in the case of the measured spectrum (for instance, mass spectrum) as illustrated in FIG. 3A. On the other hand, there is a spectroscopy which uses a spectrum in an ultraviolet region, a visible region and an infrared region, or a Raman spectroscopy which uses a Raman spectroscopic spectrum, as the measured spectrum. The spectrum measured when such a spectroscopy has been used forms a measured signal illustrated in FIG. 3B. In this case, the signal intensity illustrated in FIG. 3C, which has been provided by the discretization of the measured signal, forms peaks of the signal intensity. Next, in the step of S102, the data is normalized and digitized. In the step of S103, multi-dimensional data is generated from the normalized and digitized data, which is formed of positions of each point at which the spectrum has been measured in the space and of a spectrum (peak component) measured at each of the points in the space.

Figure 2:
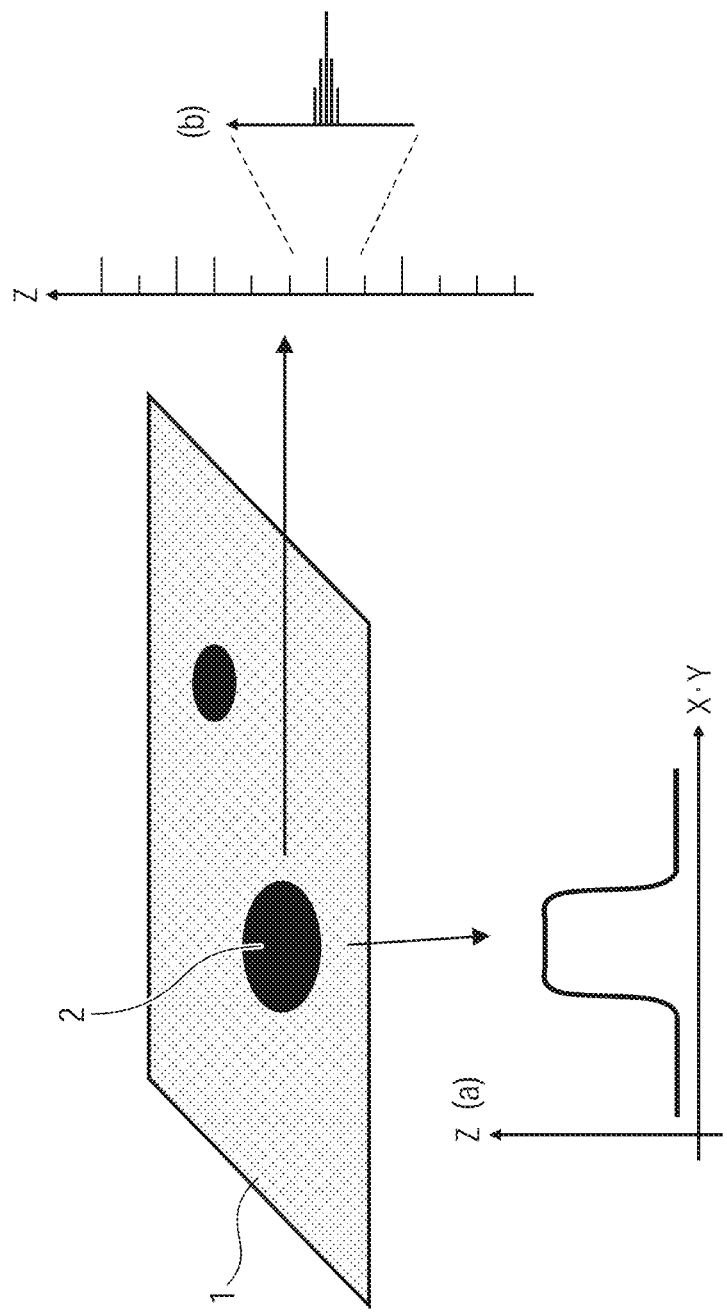
FIG. 2 is a schematic view of a spectrum signal having an intensity distribution in a two-dimensional plane.

A view illustrated in FIG. 2 is a schematic view illustrating the intensity distribution of the measured spectrum which has been measured in each of the points on the space. For instance, when a two-dimensional plane is considered as a space in which signals are acquired, the information becomes three-dimensional data. Each of the points of the three-dimensional space from which these three-dimensional data are generated is expressed by a coordinate (X, Y, Z). The components X and Y are coordinates on the two-dimensional space (XY plane) in which the measured spectrum signal is contained, and correspond to FIG. 2A. The component Z is a measured spectrum signal at each of the points on the XY plane, and corresponds to FIG. 2B. Accordingly, the components X and Y store the X-coordinate and the Y-coordinate of the point at which the signal has been measured, and the component Z stores a value of the measured signal corresponding to the intensity of each peak component.

In the step of S104 in FIG. 4, the signal is classified by the generated classifier, and an image is output. Machine learning, for instance, can be used for the generation of this classifier. In this machine learning, a determination criterion is generated which connects the measured data and the information on the biological tissue, from already acquired data (which is referred to as training data).

Figure 5:
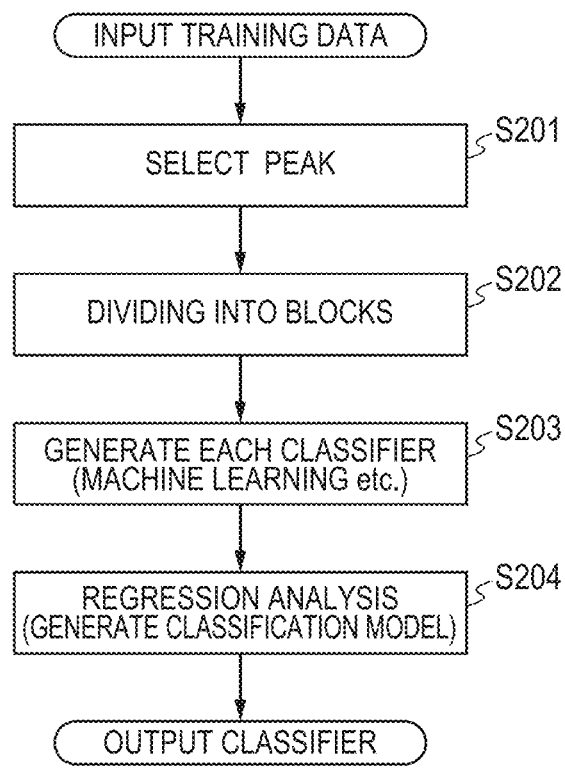
FIG. 5 is a flow chart of machine learning with the use of a classification analysis of a block of the present invention.

A view illustrated in FIG. 5 is a flow chart for generating the classifier. The content will be described below with reference to the drawing according to the order in this flow chart.

In the step of S201 in FIG. 5, a peak to be used in the image reconstruction is selected. Next, in the step of S202, the image data are divided into blocks. Here, the division into blocks means that an image region is divided into each of a plurality of small blocks. In the step of S203, the classifier is generated in each block from the data of each of divided blocks, for instance, by machine learning. As for a technique of the machine learning, such methods can be used as a Fisher's linear discriminant method, a SVM (Support Vector Machine), a decision tree, and a random forest method which considers the ensemble average thereof. In the step of S204, a classification model which can be applied to all of the image regions is generated by a regression analysis of classification conditions obtained in each of the image blocks. Incidentally, this step may be omitted, and it is acceptable, instead, to reconstruct the biological tissue image per every image block by using the classifier generated in each image block, and then integrate these images by interpolation processing and the like to generate the biological tissue image in the image region. The case will be described below where the Fisher's linear discriminant method has been employed, as one example of supervised machine learning. Incidentally, the discriminant analysis means the Fisher's linear discriminant method, and the classification conditions mean discriminant conditions which have been acquired by the application of the Fisher's linear discriminant method.

The image region of an object may be all of the image regions to be acquired, and may also be an image region which has been partially selected. When the image region which has been partially selected is the object, it is acceptable, for instance, to previously set the image region which is not the object such as an outer peripheral portion, in all of the acquired image regions, and set the image region except for the previously set image region.

FIGS. 6A to 6C illustrate a process of separating and classifying a plurality of groups from spectrum data by the discriminant analysis. A white frame in FIG. 6A shows a region in which the spectrum data to be used as training data is acquired. FIG. 6B is a schematic view of the spectrum data to be used. Each spectrum of an object to be learned is accompanied by a classification number (label) of the biological tissue, such as 1 for a cancer tissue and 0 for a normal tissue, for instance. FIG. 6C schematically illustrates such a state that a feature value which has been acquired from the spectrum data is projected to a feature space (classification space) and an optimal boundary line is determined by the discriminant analysis. Here, the feature space means a space to which the feature value is projected in order to classify the attribute of the data, and the feature value means a value suitable for classification, which is generated from original data. A normalized peak intensity and the like can be considered as the feature value in this case.

FIGS. 7A to 7C schematically illustrate a state of inter-group dispersion and intra-group dispersion which are projected components to a projection axis. FIG. 7B illustrates the inter-group dispersion corresponding to a distance between gravity centers of each group, and the inter-group dispersion is given by Expression (1).

$$\{w^T(\bar{x}_1 - \bar{x}_1)\}^2 \qquad \text{[Expression 1]}$$

In addition, FIG. 7C illustrates the intra-group dispersion equivalent to dispersion within each group, and the intra-group dispersion is given by Expression (2).

$$\frac{1}{n_1 + n_2 - 2}\{(n_1 - 1)w^T S_1 w + (n_2 - 1)w^T S_2 w\} = w^T S w \qquad \text{[Expression 2]}$$

$$S = \frac{1}{n_1 + n_2 - 2}\{(n_1 - 1)S_1 + (n_2 - 1)S_2\}$$

The vector w in the above Expression means a coefficient vector shown in the following Expression (3). The vectors $x_1$ and $x_2$ in the above Expression mean a sample average vector of each group shown by the following Expression (4). The matrices $S_1$ and $S_2$ in the above Expression mean a sample-variance covariance matrix of each group shown by the following Expression (5). The expressions are expressions in the case where the feature space is two dimensional, respectively. In addition, $n_1$ and $n_2$ are the numbers of the data of each group.

$$w = \begin{pmatrix} w_1 \\ w_2 \end{pmatrix} \quad \text{[Expression 3]}$$

$$\bar{x}_1 = \begin{pmatrix} \bar{x}_1^{(1)} \\ \bar{x}_2^{(1)} \end{pmatrix} \quad \text{[Expression 4]}$$

$$\bar{x}_2 = \begin{pmatrix} \bar{x}_1^{(2)} \\ \bar{x}_2^{(2)} \end{pmatrix}$$

$$S_1 = \begin{pmatrix} s_{11}^{(1)} & s_{12}^{(1)} \\ s_{21}^{(1)} & s_{22}^{(1)} \end{pmatrix} \quad \text{[Expression 5]}$$

$$S_2 = \begin{pmatrix} s_{11}^{(2)} & s_{12}^{(2)} \\ s_{21}^{(2)} & s_{22}^{(2)} \end{pmatrix}$$

The Fisher's linear discriminant method is a method of determining an axis that maximizes a ratio of the inter-group dispersion and the intra-group dispersion which are the projected components to the axis, and such an axis is given by Expression (6). In Expression (6), x represents a coordinate in a feature space, and a position at which a reference numeral of H(x) changes becomes a boundary that distinguishes both of the groups.

$$h(x) = (\bar{x}_1 - \bar{x}_2)^T S^{-1} x - \frac{1}{2}(\bar{x}_1 - \bar{x}_2)^T S^{-1}(\bar{x}_1 + \bar{x}_2) \quad \text{[Expression 6]}$$

FIG. 7A schematically illustrates a classification axis which is determined by the discriminant analysis.

FIGS. 8A to 8C schematically illustrate such a state that confounding occurs when the discriminant analysis is conducted with the use of data in a plurality of different image blocks. The confounding means such a phenomenon that the data are mixed when the data having different properties are used. The white frame in FIG. 8A shows the block in the image of which the data is used. FIG. 8B schematically illustrates spectrum data corresponding to the blocks, and FIG. 8C schematically illustrates such a state that the data are mixed due to confounding occurring when those data are projected to the feature space.

FIGS. 9A to 9C schematically illustrate such a state that the classification conditions (which are determined from Expression (6)) for each image block are acquired by local management of the data, the acquired classification conditions are subjected to the regression analysis, and thereby classification models capable of being applied to the image regions are acquired. Here, the local management of the data means that the data is divided in such a degree that confounding of the data does not occur. The white frame in FIG. 9A shows the block in the image of which the data is used. FIG. 9B illustrates such a state that the discriminant analysis is applied to each of the image blocks. FIG. 9C illustrates such a state that the regression analysis of the classification conditions is conducted. Thus, the image is divided into an appropriate image block size in such a degree that confounding does not occur. The classification model is constructed which can be appropriately applied to the image region, by the regression analysis of the classification conditions that have been acquired from the discriminant analysis of each of the blocks. Thereby, it is enabled to conduct an appropriate classification while preventing the confounding of the data. For information, the optimal image block size can be determined, for instance, by using such a statistical test as is given by Expression (7), a misclassification rate of the training data, and the like.

$$z_0 = \frac{\bar{x}_1 - \bar{x}_2}{\sqrt{\frac{\hat{\sigma}_1^2}{n_1} + \frac{\hat{\sigma}_2^2}{n_2}}} \quad \text{[Expression 7]}$$

Here, $\sigma_1$ and $\sigma_2$ in Expression (7) mean a sample variance of each group. In addition, $z_0$ is a test value, and the block size is determined so that the value becomes a constant value or more (for instance, 1.96 or more).

FIGS. 10A to 10C schematically illustrate a series of processes illustrated in the flow charts in FIG. 4 and FIG. 5. In FIG. 10A, the classification model is generated by the machine learning and the regression analysis, and in FIG. 10B, data which have been newly measured are input. Then, in FIG. 10C, a distribution image (which is obtained from result of machine learning) of the biological tissue distribution, for instance, is acquired as a reconstruction image.

In addition, the data to be used in the machine learning and the classification may not only be spectrum data of each point in the space, but also both the spectrum data of each point in the space and the distribution information (morphological information) of each spectrum component, for instance, may be used.

In this case, a peripheral area of a pixel which receives attention, for instance, is cut out, and attention is paid to a pattern which the region forms. For instance, when the two-dimensional plane is considered as a space of which the signal is acquired, the data to be used in the machine learning and the classification shall be data having a three-dimensional structure in a total of the distribution information and the spectrum information in the plane (which is referred to as multi-dimensional information).

The procedure of the machine learning and the classification in the case where the multi-dimensional information has been used is essentially the same as that in the case where the above described spectrum data has been used. However, in this case, the data itself is not used for a vector (which is referred to as feature vector hereafter) for use in the classification, but also it is possible to acquire a plurality of feature values suitable for describing the pattern, define the feature values as a feature vector, and use the feature vector for the machine learning and the classification processing. As a representative example of the feature value, there are a volume, a curvature, a space gradient, HLAC (high-order local autocorrelation) and the like. Here, the high-order autocorrelation function of N-order is defined by Expression (8) for displacement directions ($a_1, a_2, \ldots, a_N$), when the image of an object is represented by f(r).

$$x_N(a_1, a_2, \ldots, a_N) = \int f(r)f(r+a_1)\ldots f(r+a_N)dr \quad \text{[Expression 8]}$$

In addition, the high-order local autocorrelation function is defined so that the displacement directions are limited to a localized area of a reference point r (for instance, 3×3 pixels around reference point r). FIG. 22 illustrates a reference pattern in the case of 0-order and 1-order. A pixel with a charcoal gray becomes a center point for a reference when the autocorrelation is calculated.

Figure 16B:
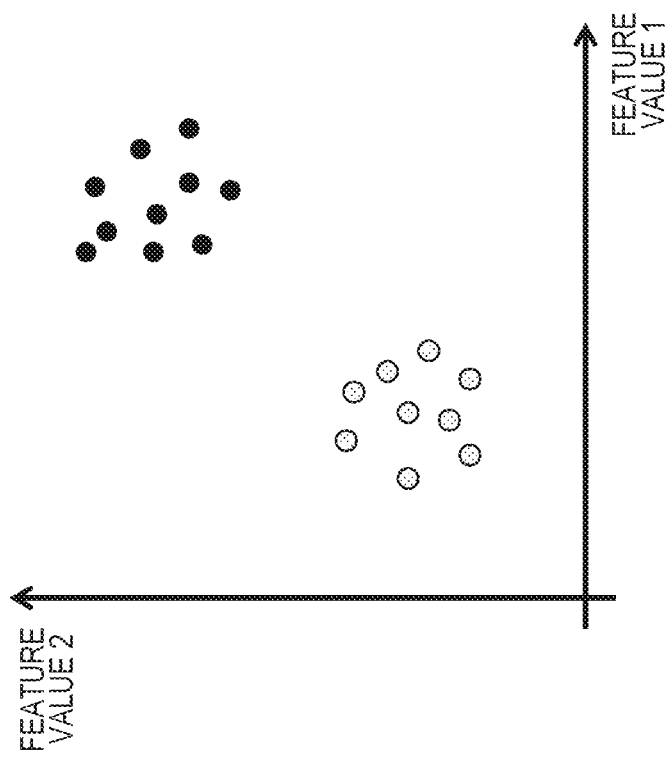
FIGS. 16A and 16B are schematic views illustrating the case where a Mahalanobis distance is relatively small and the case where the Mahalanobis distance is relatively large.
Figure 16A:
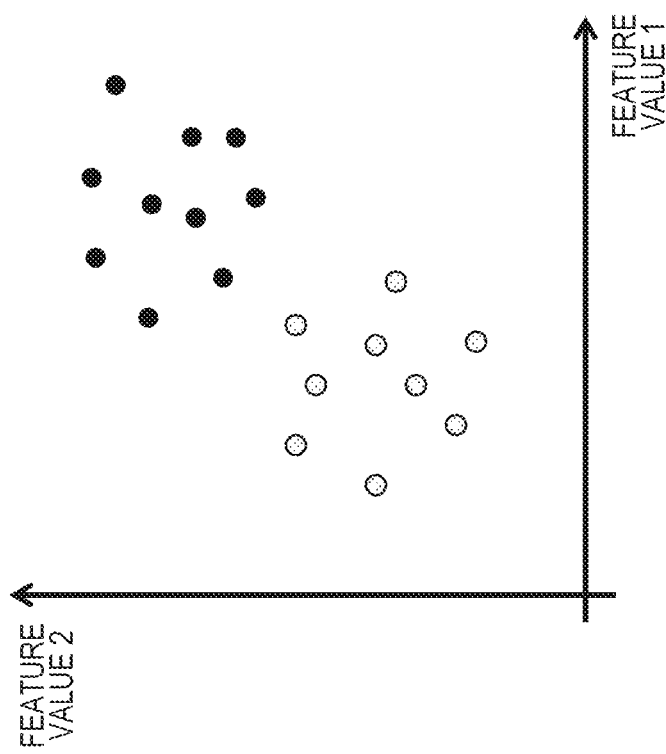

In addition, it is also possible to select the feature value to be used in the machine learning beforehand. In this case, for instance, it is acceptable to calculate a Mahalanobis distance which is obtained by projecting each of the feature values to the feature space and is defined by the ratio of the inter-group dispersion and the intra-group dispersion of each group, and to select the feature value for use in the classification. The result that the Mahalanobis distance is small corresponds to the case as in FIG. 16A, and the result that the Mahalanobis distance is large corresponds to the case as in FIG. 16B, when illustrated by Comparative Examples. If the Mahalanobis distance is large, the classification becomes easier. Accordingly, it is also possible to preferentially select such a feature value that the Mahalanobis distance between each group that receives attention is large.

Figure 1:
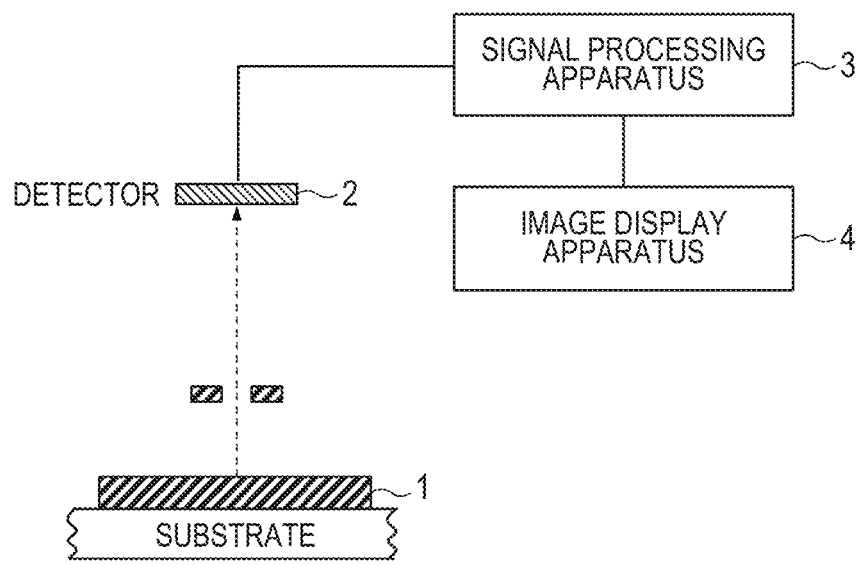
FIG. 1 is a schematic view of an apparatus on which the present invention is mounted.

The present invention can be achieved by an apparatus which carries out the above described specific embodiment. FIG. 1 illustrates one example of the configuration of the whole apparatus on which the present invention is mounted. A specimen 1 on a substrate and a detector 2 for a signal are shown. In addition, a signal processing apparatus 3 which conducts the above described processing for the acquired signal, and an image display apparatus 4 which displays the signal processing result on a screen are shown.

The configuration will be more specifically described while taking a TOF-SIMS as an example. In the configuration, the detector 2 measures secondary ions (which are shown by dotted line in FIG. 1) which are generated in the specimen 1 that has been irradiated with primary ions (not-shown), and transmits the signal which has been converted into an electrical signal, to the signal processing apparatus 3. For information, the type of the primary ion is not limited, and a usable detector includes not only a detector for one dimension but also a semiconductor detector for two dimension. Furthermore, it is possible to use a laser in place of the primary ion, and also to use a specimen stage having a scanning function together. The measured data has a three-dimensional data structure in which a mass spectrum is stored in a coordinate point on the XY plane of the specimen 1. In addition, when the data has been integrated, the measured data becomes four-dimensional data. However, the integrated data becomes three dimensional, and can be subjected to similar processing.

Figure 17:
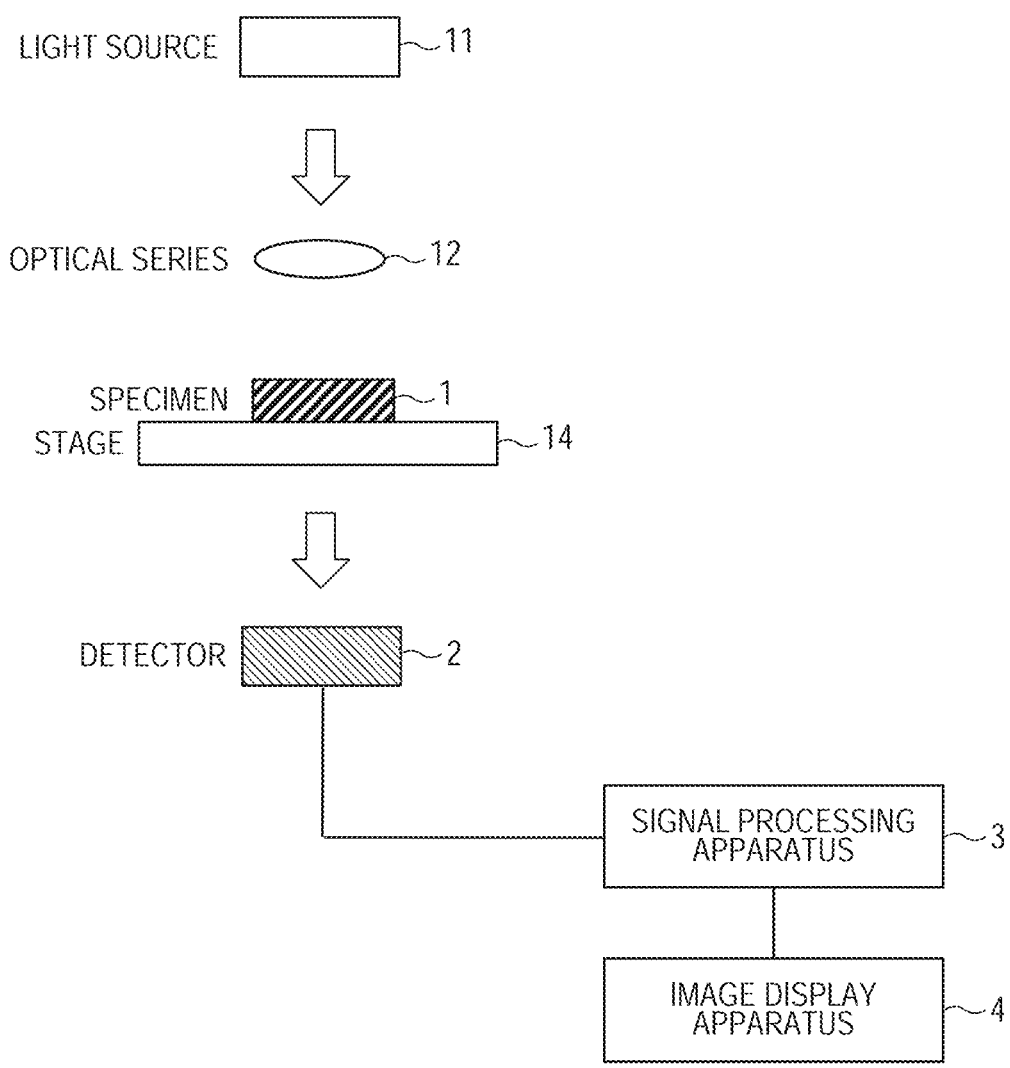
FIG. 17 is a schematic view of an apparatus shown in a second exemplary embodiment of the present invention.

In addition, FIG. 17 also illustrates one example of the configuration of the apparatus on which the present invention is mounted. A light source 11 and an optical system 12 are shown. In addition, the specimen 1 to be measured, a stage 14 on which the specimen is arranged, and the detector 2 for a signal are shown. In addition, the signal processing apparatus 3 which subjects the acquired signal to the above described processing, and the image display apparatus 4 which displays the signal processing result on the screen are shown.

In FIG. 17, a measurement system of a transmission type of arrangement is shown, but a reflection type of arrangement is also possible. In addition, ultraviolet rays, visible light, infrared rays and the like can be used as a light source. The detector also includes a single detector, a line-shaped detector and a two-dimensional detector, and the type is not limited. Furthermore, such a method is also acceptable as to combine an interferometer with the apparatus and acquire a spectrum through Fourier transformation or Laplace transformation. It is also possible to add the scanning function to the specimen stage. The measured data has a three-dimensional data structure in which the spectrum is stored in the coordinate point on the XY plane of the specimen 1. In addition, when the data has been integrated, the measured data becomes four-dimensional data. However, the integrated data becomes three dimensional, and can be subjected to similar processing.

In addition, FIG. 17 includes also nonlinear spectroscopy such as coherent anti-Stokes Raman scattering (CARS, Coherent Anti-Stokes Raman Scattering) and stimulated Raman scattering (SRS, Stimulated Raman Scattering).

Furthermore, the signal processing apparatus and the image output apparatus (that handle signal after detector) which are features of the present invention can be also applied to the configuration, as long as the apparatus has such a structure that the spectrum is stored in the coordinate point on one particular cross section (which has constant thickness) of the specimen. Specifically, the apparatuses can be applied also to a two-dimensional spectrum measuring system with the use of X-rays, a terahertz wave, an electromagnetic wave or the like.

Exemplary Embodiment 1

Exemplary Embodiment 1 of the present invention will be described below. In the present exemplary embodiment, a tissue slice (product made by Pantomics, Inc.) of an expression level 2+ of a HER2 protein which had been subjected to trypsin digestion processing was subjected to an SIMS measurement on the following conditions, in which a TOF-SIMS 5 type apparatus (trade name) made by ION-TOF GmbH was used.

Primary ion: 25 kV $Bi^+$, 0.6 pA (pulse current value), macro-raster scan mode

Pulse frequency of primary ion: 5 kHz (200 μs/shot)

Pulse width of primary ion: approximately 0.8 ns

Beam diameter of primary ion: approximately 0.8 μm

Measurement range: 4 mm×4 mm

Pixel number in measurement of secondary ion: 256×256

Integration period of time: 512 shots for one pixel, one time scan (approximately 150 minutes)

Detection Mode for Secondary Ion: Positive Ion

The XY coordinate information which shows the positions for each measurement pixel and the mass spectrum in one shot are recorded in the obtained SIMS data. For instance, each of the measurement pixels contains the information on the peak (m/z=720.35) which corresponds to a mass number of a molecule in one of digestive fragments of the HER2 protein, to which one sodium atom adsorbs, and on the peak components originating in each biological tissue, as the spectrum data.

Figure 11C:
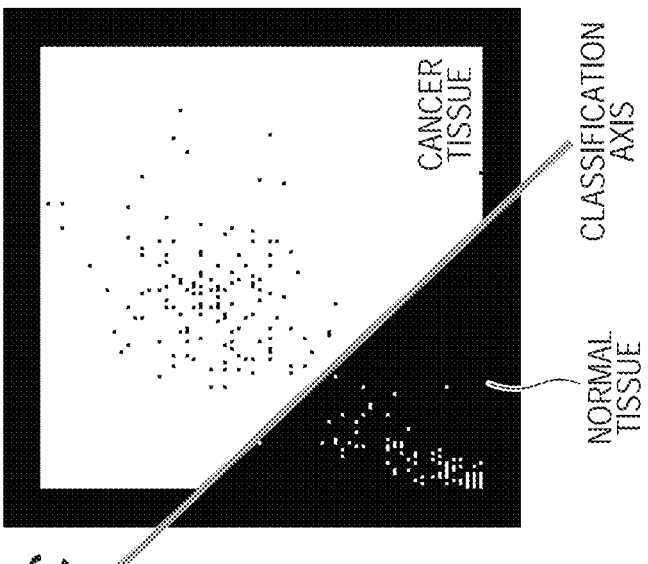
FIGS. 11A, 11B and 11C are views illustrating an application process of a first exemplary embodiment of the present invention.
Figure 11A:
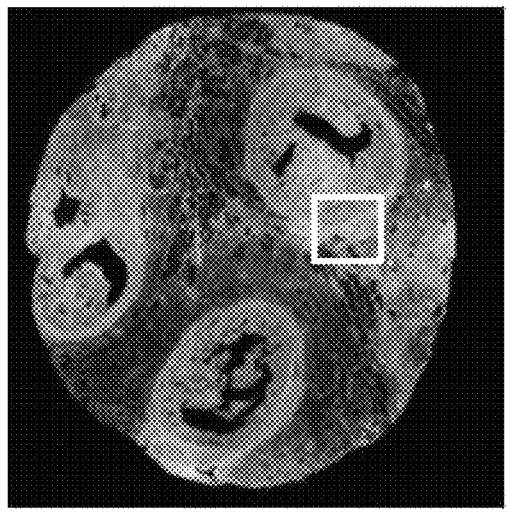

FIG. 11A illustrates an image obtained through the observation of the tissue slice (product made by Pantomics, Inc.) of the expression level 2+ of the HER2 protein, of which the HER2 protein was subjected to immunostaining, by an optical microscope. In FIG. 11A, the portion in which there are more expressions in the HER2 protein is indicated whiter. In addition, the specimen that was used in the SIMS measurement and the specimen that was subjected to the immunostaining are adjacent slices to each other, which were cut out from the same diseased tissue (paraffin block), and are not identical.

Figure 11B:
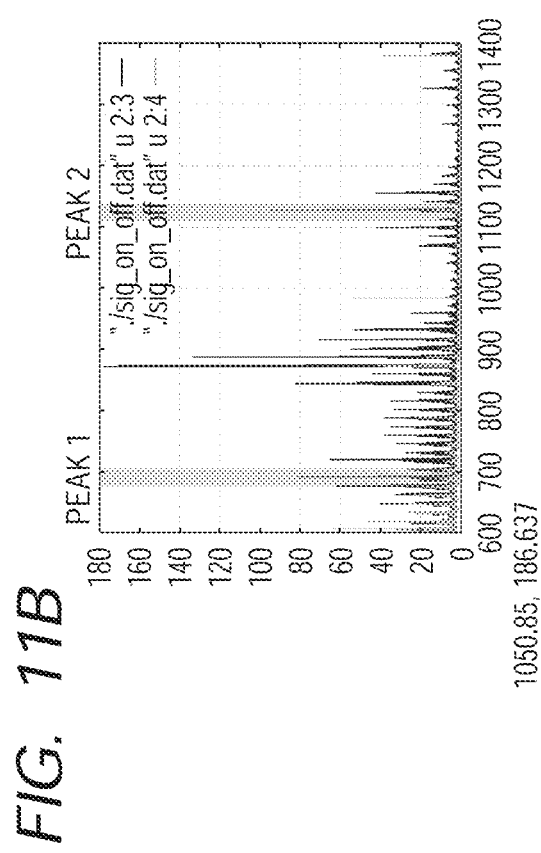

FIG. 11B illustrates a spectrum which was measured in an image block surrounded by the white frame in FIG. 11A. FIG. 11C illustrates a result of the discriminant analysis that was conducted for two peak components (values of corresponding m/z are 692.35 and 1101.5, respectively), which were selected from the spectrum of FIG. 11B. It is understood in FIG. 11C that the different groups can be clearly separated from each other.

Figures 12A, 12B:
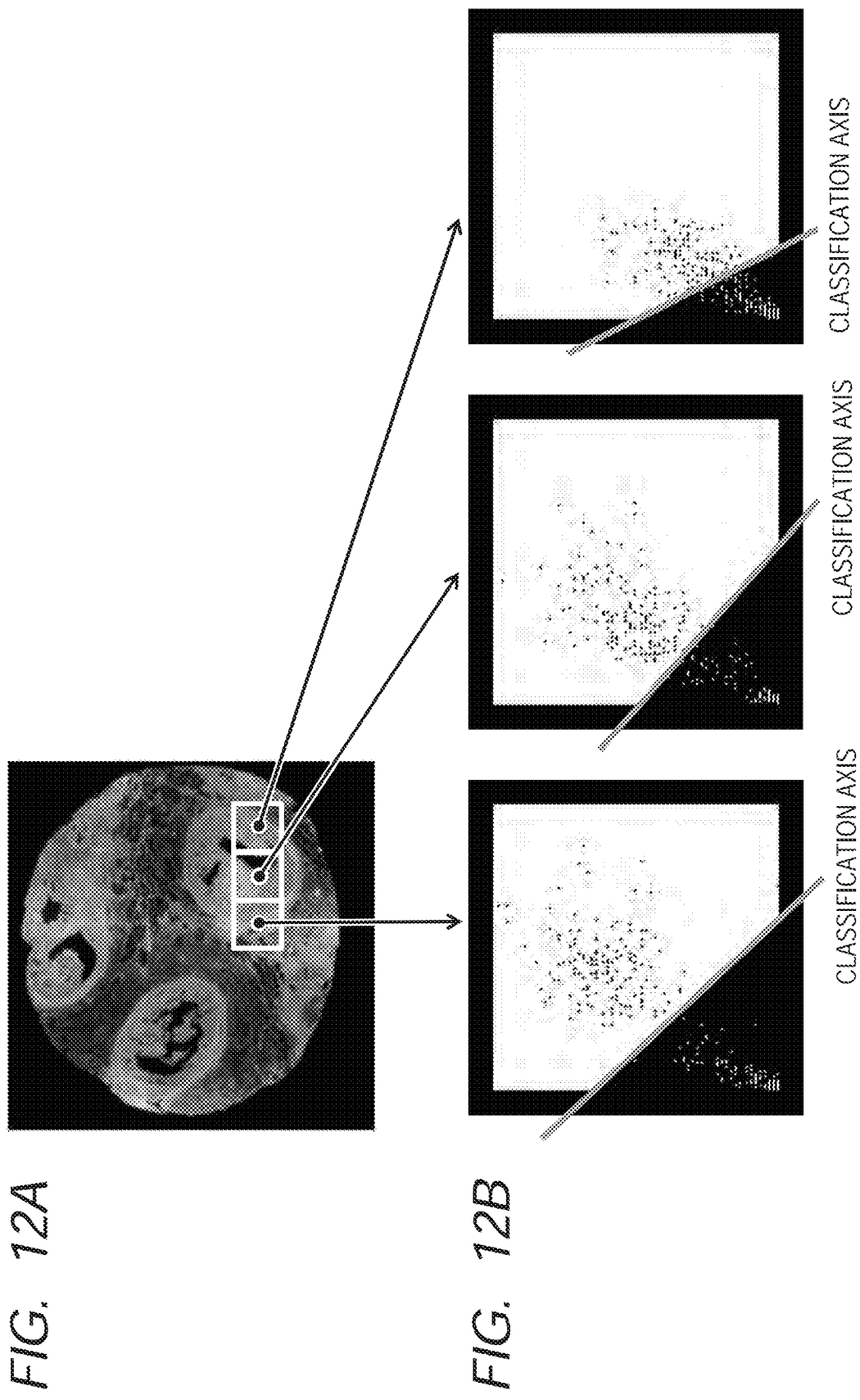
FIGS. 12A and 12B are views illustrating that classification conditions are different among the blocks of the different images.

The white frames in FIG. 12A illustrate a plurality of image blocks. FIG. 12B illustrates a result of the discriminant analysis which was conducted for the spectrum data of each of the image blocks. It is understood in FIG. 12B that the characteristics of the data change according to the positions of the image blocks, and the classification condition also changes according to the change of the characteristics.

The white frame in FIG. 13A illustrates an image block formed by a combination of the plurality of the image blocks in FIG. 12A. FIG. 13B illustrates a result of the plotting of the data in the white frame in FIG. 13A on the feature space. It is understood that such a phenomenon that data in different groups are mixed with each other, which is so-called confounding, occurs in the white frame in FIG. 13B.

FIG. 14A illustrates a result of the division of the image region into image blocks. FIG. 14B illustrates a result of the regression analysis which was conducted for the classification conditions based on the result of the discriminant analysis that was conducted for a plurality of the image blocks. From the result of this regression analysis, a classification model is generated which can be applied to the image region.

Figure 15B:
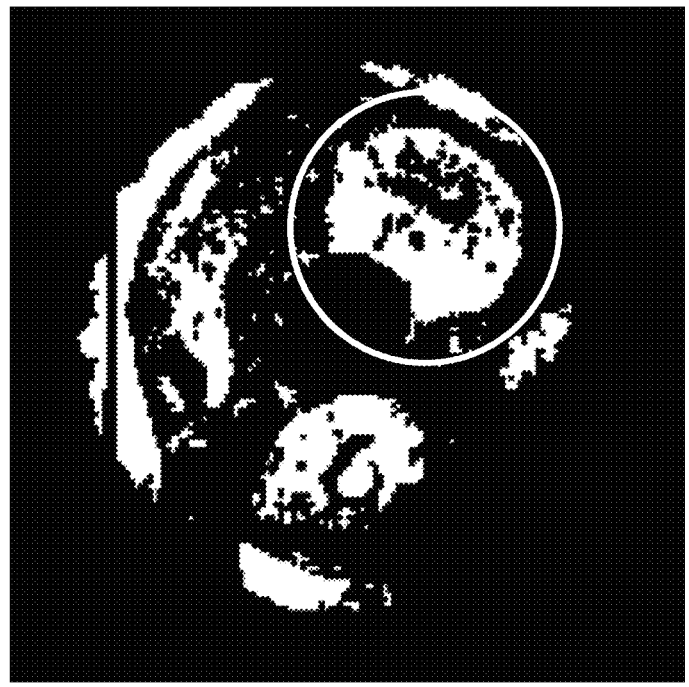
FIGS. 15A and 15B are views illustrating an application effect of the first exemplary embodiment of the present invention.
Figure 15A:
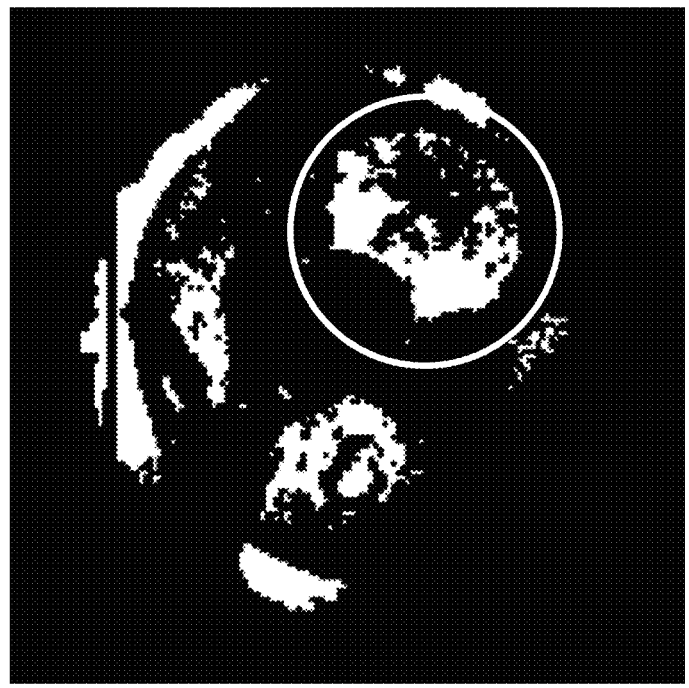

FIG. 15A illustrates a result of the reconstruction of the image, by the application of the classification conditions obtained from the discriminant analysis of a single image block, to the image region. In addition, FIG. 15B illustrates a result of the reconstruction of the image, by the application of the discriminant analysis of the divided blocks according to the present invention, to the image region. As is understood when the inside of the white frame is referred and compared to FIG. 11A of reference, a biological tissue image with higher precision can be acquired according to the present invention.

Exemplary Embodiment 2

Exemplary Embodiment 2 of the present invention will be described below. In the following exemplary embodiment, a mouse liver tissue was measured with the use of a microscope which uses stimulated Raman scattering. The power of a TiS laser used as a light source was 111 mW, and the intensity of an Yb fiber laser was 127 mW before the laser was incident on an object lens. The mouse liver tissue of the specimen was subjected to formalin fixation treatment, and was cut into a thin slice with a thickness of 100 micrometers. The tissue slice was subjected to measurement in a state of being embedded in a glass together with a PBS buffer. The measurement range is a 160 micrometers square, and the data measured 10 times were integrated. The image data was a 500 pixels square, and the measurement period of time was 30 seconds.

The XY coordinate information which shows the positions of each measurement pixel, and the spectrum information in each coordinate are recorded in the obtained spectral image data. For instance, each of the measurement pixels contains the information on the peak components originating in the components of the tissue constituting the specimen, as the spectrum data. In addition, the measurement of the spectrum data was conducted with a sampling interval of 1 kayser (1 cm$^{-1}$).

Figure 18A:
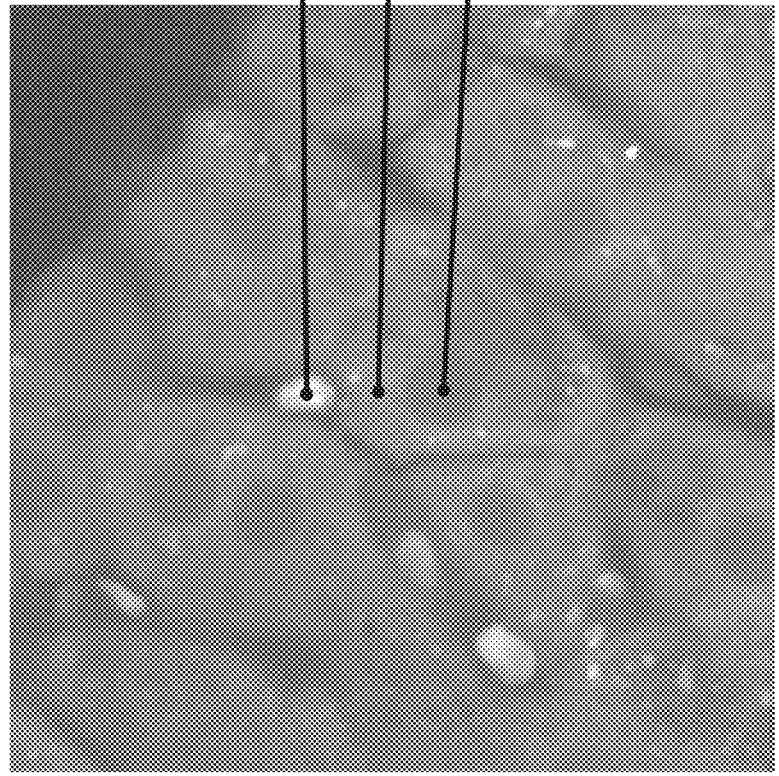
FIGS. 18A and 18B are views illustrating a spectrum image and spectra, which have been used in the second exemplary embodiment of the present invention.
Figure 18B:
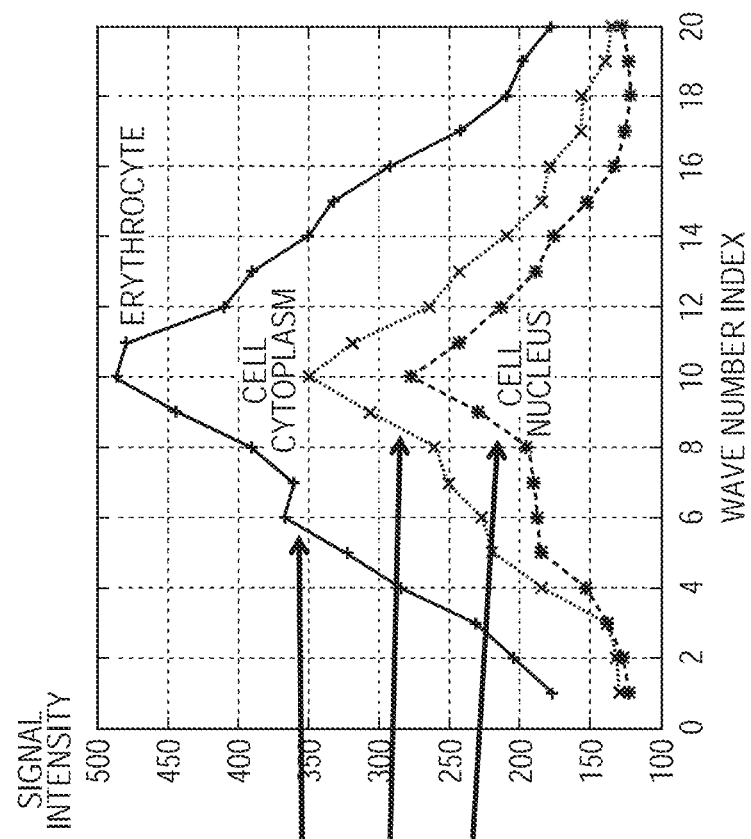

FIG. 18A is an image formed by adding up of signals in all measured spectral regions, which are based on a measurement result of a liver tissue. FIG. 18B is a graph obtained from picked-up spectra of portions corresponding to the cell nucleus, the cell cytoplasm and the erythrocyte; and in the graph, a horizontal axis corresponds to a wave number (while the numerical value in the graph is an index for distinguishing the wave number and the index will be referred to hereafter), and a vertical axis corresponds to signal intensity. It is understood that spectrum signals different among each tissue are obtained, as is illustrated in FIG. 18B.

Figure 19A:
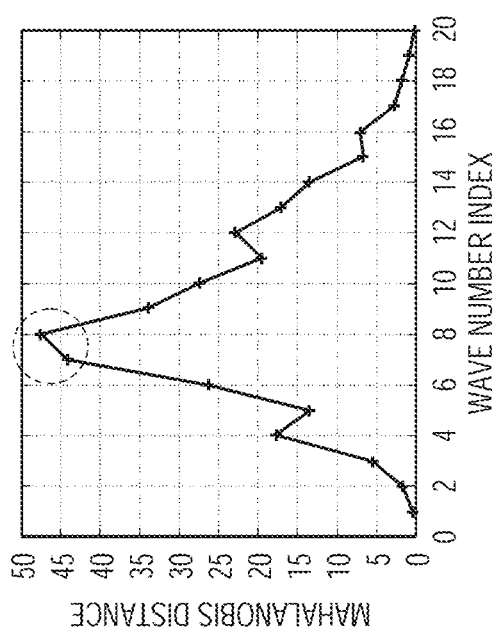
FIGS. 19A, 19B, 19C and 19D are views illustrating an effect of the selection of a feature value in the second exemplary embodiment of the present invention.
Figure 19B:
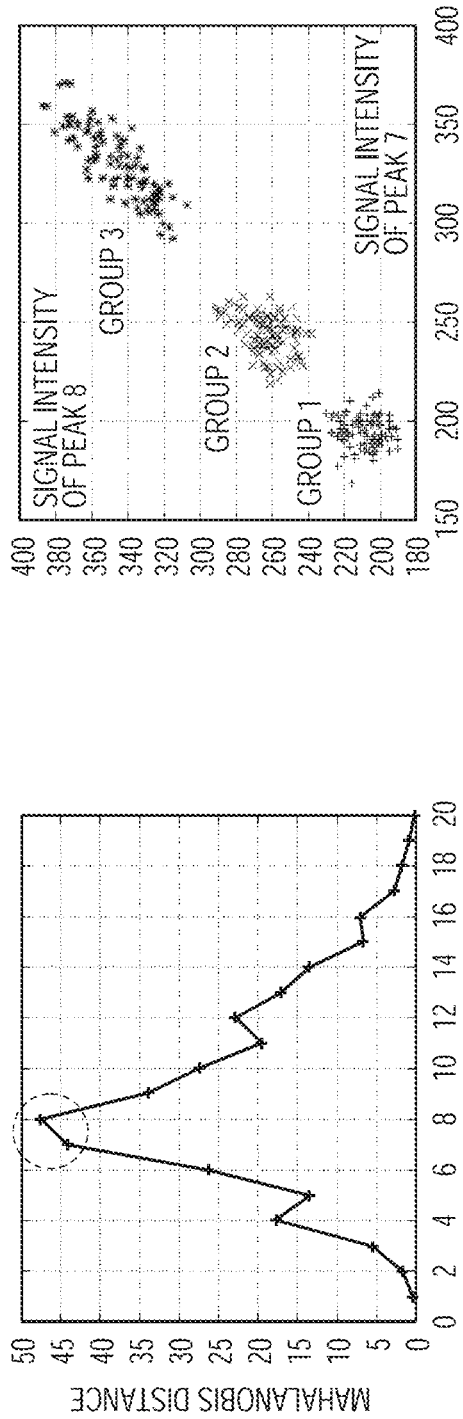
Figure 19C:
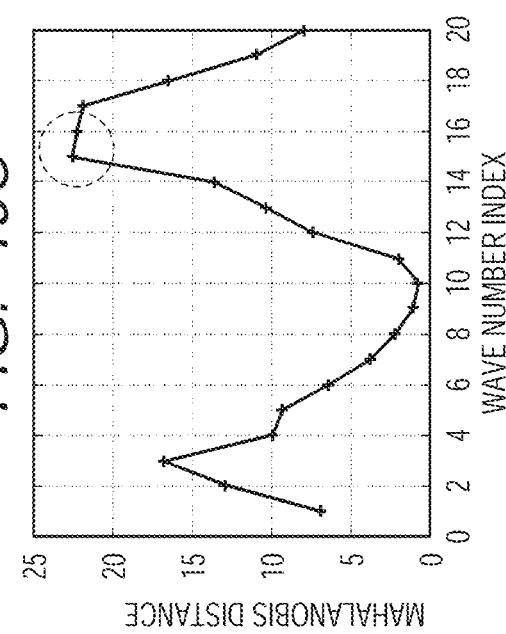
Figure 19D:
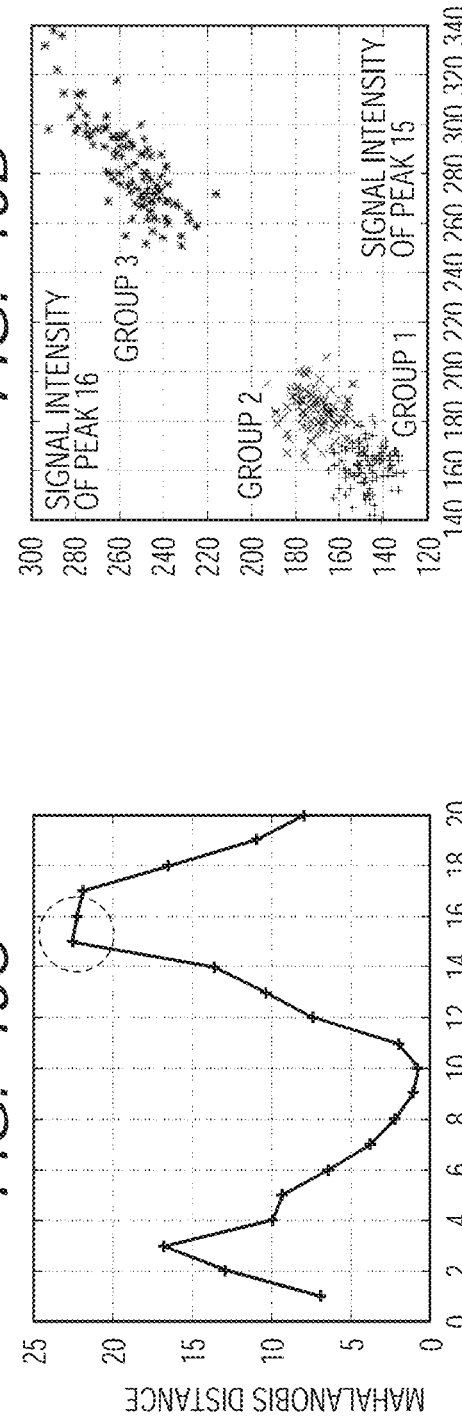

FIG. 19A is a graph obtained from the calculation of a Mahalanobis distance between the cell nucleus (group 1) and the cell cytoplasm (group 2) for each wave number. It is understood that the Mahalanobis distance is large when the indices are values between 7 and 8. FIG. 19B is a graph obtained by determining the spectrum intensities corresponding to the indices 7 and 8 as the feature values, and plotting one part of the training data onto the two-dimensional feature space. It is understood that the group 1 and the group 2 can be clearly distinguished. FIG. 19C is a graph obtained from the calculation of a Mahalanobis distance between the cell cytoplasm (group 2) and the erythrocyte (group 3) for each wave number. It is understood that the Mahalanobis distance is large when the indices are values between 15 and 17. FIG. 19D is a graph obtained similarly by determining the spectrum intensities corresponding to the indices 15 and 16 as the feature values, and plotting one part of the training data onto the two-dimensional feature space. It is understood that the group 2 and the group 3 can be clearly distinguished. On the other hand, it is understood that the group 1 and the group 2 result in resisting being distinguished. In such a case, it is acceptable to use all of the feature values which are suitable for classification among each of the groups, and then project the resultant feature values to the feature space. In this case, it is acceptable, for instance, to determine the spectrum intensities corresponding to the indices 7, 8 and so on, and 15, 16 and so on as the feature values, project the resultant feature values to the multidimensional feature space, and classify each group.

Figure 20:
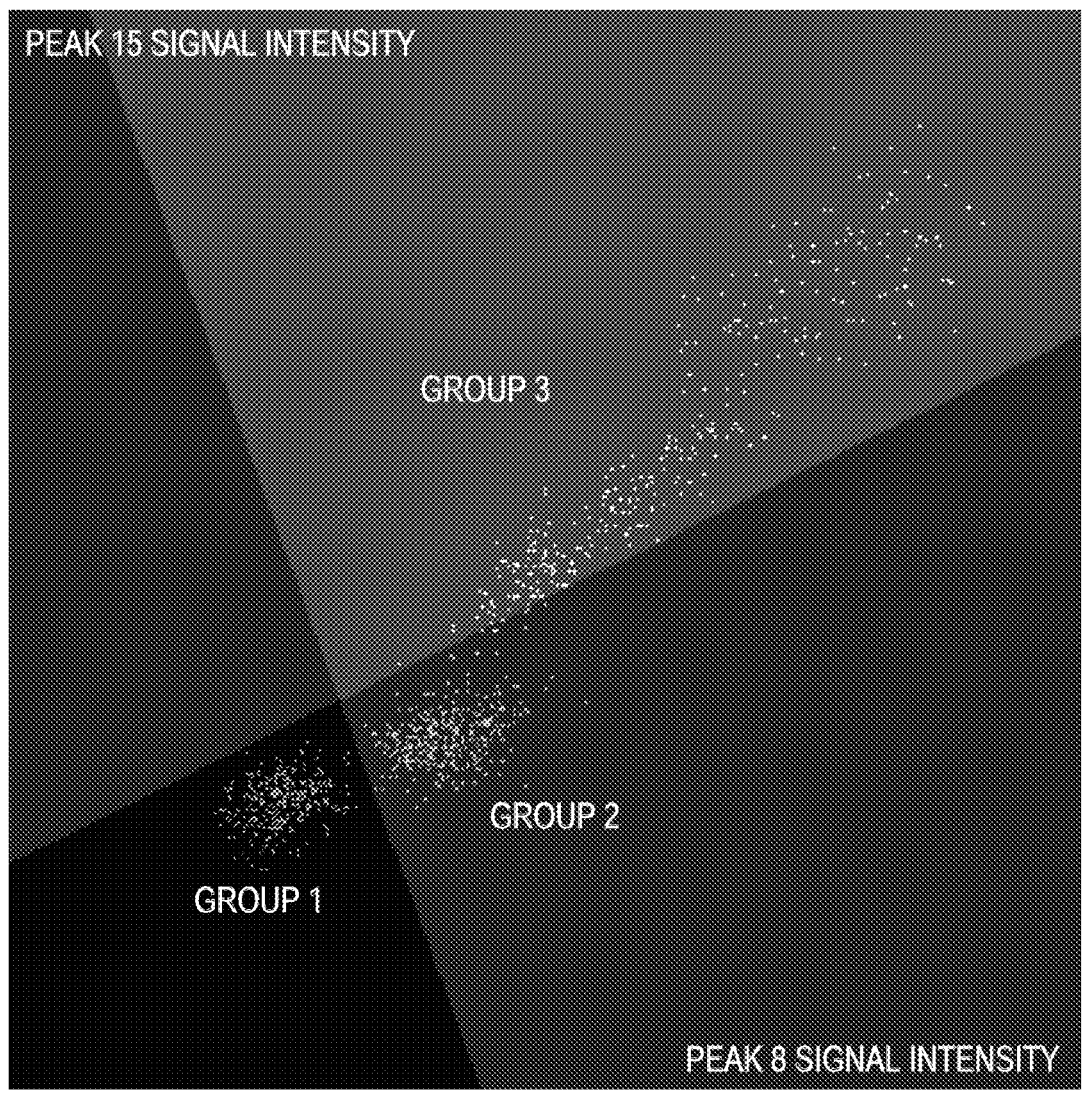
FIG. 20 is an image illustrating a result of the discriminant analysis which has been conducted in the second exemplary embodiment of the present invention.

FIG. 20 is a result of the discriminant analysis which has been conducted for the plotting of spectrum intensities corresponding to the index 8 and the index 15 on a two-dimensional space, with the use of training data that correspond to the cell nucleus (group 1), the cell cytoplasm (group 2) and the erythrocyte (group 3), respectively. It is understood that each group can be clearly separated from each other.

Figure 21:
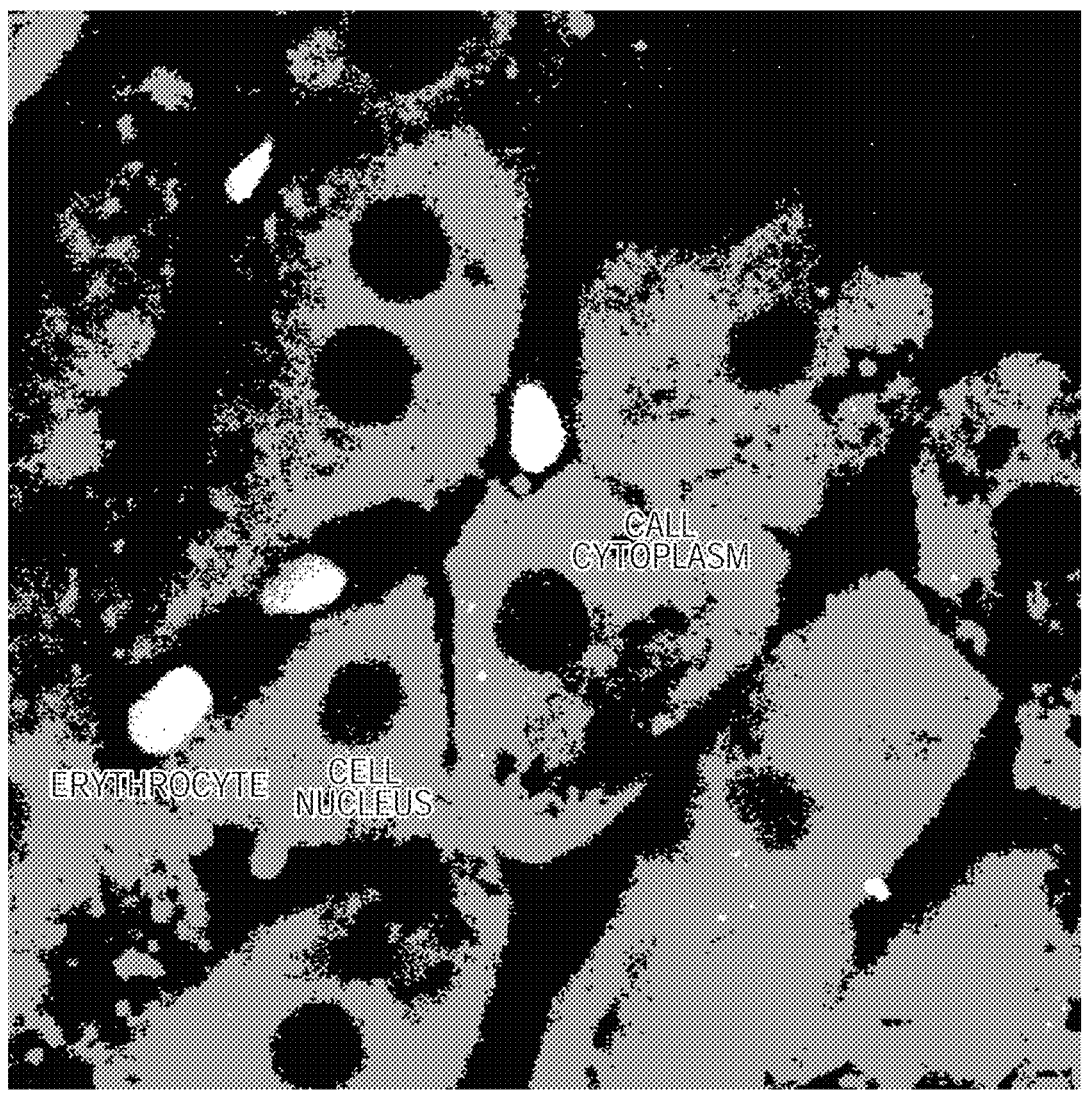
FIG. 21 is an image illustrating a result of the present invention in the second exemplary embodiment of the present invention.

FIG. 21 is an image obtained by classifying the cell nucleus, the cell cytoplasm and the erythrocyte based on the result of the previously described discriminant analysis, and reconstructing the resultant image. It is understood that each tissue is appropriately classified and is color-coded. Thus, the present invention can classify a structure in a biological tissue without dyeing.

Figure 23B:
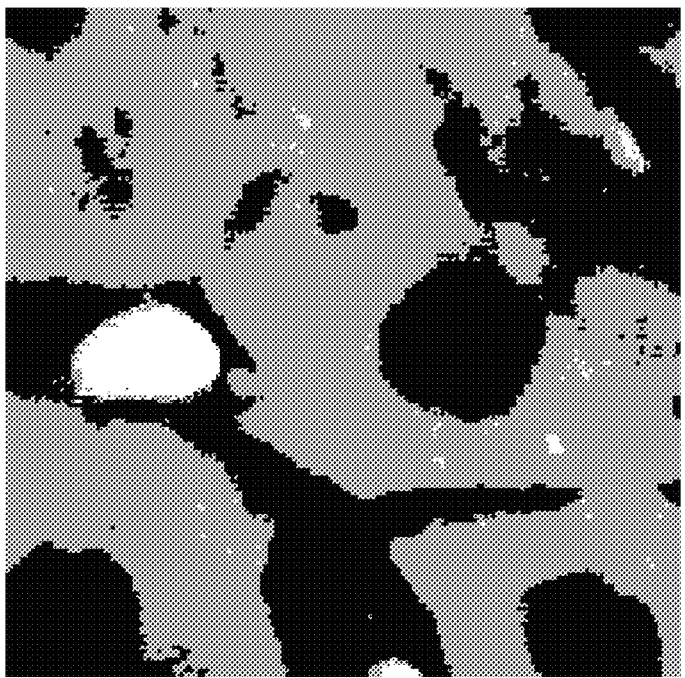
FIGS. 23A and 23B are images illustrating an effect of the application of multidimensional information in the second exemplary embodiment of the present invention.
Figure 23A:
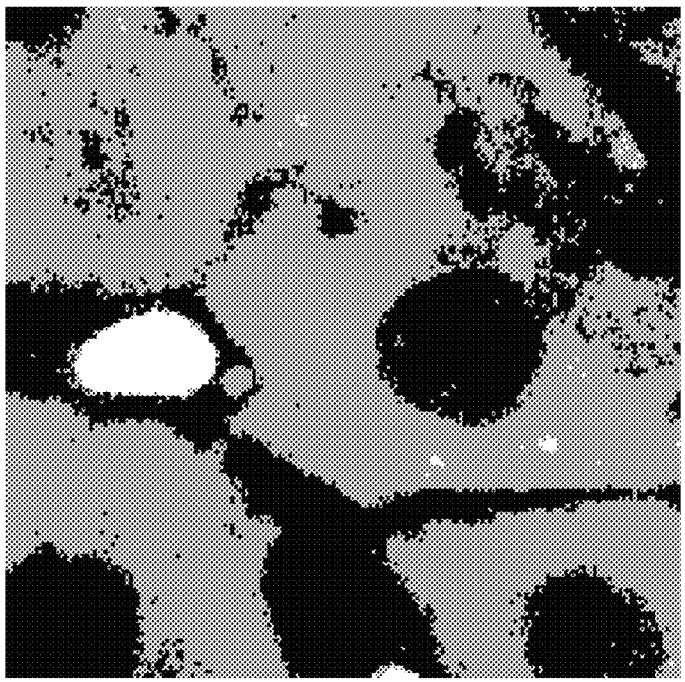

FIG. 23A illustrates a result of classification processing that has been conducted with the use of only spectrum intensity as a feature value; and FIG. 23B illustrates a result of classification processing that has been conducted with the use of the spectrum intensity and HLAC in 0-order and 1-order, which is calculated from the distribution of the spectrum intensity, as a feature value. It is understood that an outline of a structure in each tissue is more clearly drawn in FIG. 23B compared to that in FIG. 23A. Thus, the outline of the structure in a biological tissue can be more clearly drawn by the utilization of such multidimensional information.

The present invention can be used as a tool which more effectively supports a pathological diagnosis.

The method according to the present invention can reconstruct a biological tissue image, by measuring a spatial distribution of a measured spectrum, using both measured spectrum information thereof and morphological information which is obtained from the distribution information of peak components and applying machine learning to the information. Furthermore, even in the case where characteristics of data change and classification conditions change due to a difference among measured positions of the measured spectrum and the like, at this time, the method can reconstruct a biological tissue image by employing appropriate classification conditions. Thereby, the biological tissue can be classified with higher precision compared to a conventional method, and accordingly the method is useful when being applied to the pathological diagnosis or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-000883, filed Jan. 8, 2013, No. 2013-163399, filed Aug. 6, 2013 and No. 2013-251050, filed Dec. 4, 2013 which are hereby incorporated by reference herein in their entirety.

What is claimed is:

1. A reconstruction method of a biological tissue image using a signal processing apparatus based on measured spectrum data corresponding to an image region of the biological tissue image comprising:
 selecting one or more peaks of the measured spectrum data;
 dividing the image region into a plurality of blocks;
 generating a classifier for each of the plurality of blocks which classifies the measured spectrum data based on the selected one or more peaks thereby obtaining a plurality of classified blocks; and
 acquiring reconstructed biological tissue image based on the plurality of classified blocks.

2. The reconstruction method of the biological tissue image according to claim 1, wherein the classifier is generated from classification conditions acquired per each of the plurality of blocks, by a regression analysis of the classification conditions.

3. The reconstruction method of the biological tissue image according to claim 1, wherein the biological tissue images acquired per each of the plurality of classified blocks are integrated to generate the reconstructed biological tissue image in the image region.

4. The reconstruction method of the biological tissue image according to claim 1, wherein each classifier is generated by applying a training data to the measured spectrum data.

5. The reconstruction method of the biological tissue image according to claim 1, wherein, at the selecting two or more of peaks of the measured spectrum data, the selected one or more peaks is selected based on Mahalanobis distance defined by a ratio of an inter-group dispersion to an intra-group dispersion.

6. The reconstruction method of the biological tissue image according to claim 1, wherein, the measured spectrum data is any data of a spectrum in an ultraviolet region, a visible region and an infrared region, a Raman spectroscopic spectrum, and a mass spectrum.

7. The reconstruction method of the biological tissue image according to claim 1, wherein, the biological tissue image is a pathological tissue image.

8. The reconstruction method of the biological tissue image according to claim 1, wherein each block is a two-dimensional image region containing a plurality of spectrum information in X and Y directions.

9. The reconstruction method of the biological tissue image according to claim 1, wherein the classification of the plurality of blocks is according to a Fisher's linear discriminant method, an SVM method (Support Vector Machine) or a random forest method.

10. The reconstruction method of the biological tissue image according to claim 1, wherein the step of acquiring the classifier includes generating a feature value for each of the plurality of blocks.

11. The reconstruction method of the image according to claim 1, wherein the measured spectrum data are correlated with a substance distributed within a biological tissue.

12. The reconstruction method of the biological tissue image according to claim 1, wherein the measured spectrum data at each of plural points with a biological tissue are acquired by an secondary-ion mass spectrometry, a Raman spectroscopy.

13. An acquiring method of a biological tissue image based on a measured spectrum data corresponding to an image region of the biological tissue image comprising:
 selecting two or more peaks of the measured spectrum data;
 dividing the image region into a plurality of blocks;
 generating a classifier for each of the plurality of blocks which classifies the measured spectrum data based on the selected one or more peaks thereby obtaining a plurality of classified blocks; and
 acquiring reconstructed biological tissue image based on the plurality of classified blocks.

14. The acquiring method of the biological tissue image according to claim 13, wherein the step of acquiring the classifier includes generating a feature value for each of the plurality of blocks.

15. A reconstruction method of an image using a signal processing apparatus based on a measured spectrum data corresponding to an image region of the image comprising:
 selecting one or more peaks of the measured spectrum data;
 dividing the image region into a plurality of blocks;
 generating a classifier for each of the plurality of blocks which classifies the measured spectrum data based on the selected one or more peaks thereby obtaining a plurality of classified blocks; and
 acquiring reconstructed image based on the plurality of classified blocks.

16. The reconstruction method of the image according to claim 15, wherein the measured spectrum data are correlated with a substance distributed within an object.

17. The reconstruction method of the image according to claim 15, wherein the measured spectrum data at each of plural points with an object are acquired by an secondary-ion mass spectrometry, a Raman spectroscopy.

18. The reconstruction method of the image according to claim 15, wherein the images acquired per each of the plurality of classified blocks are integrated to generate the reconstructed image in the image region.

* * * * *